US008667521B2

(12) United States Patent  
Vandermolen et al.

(10) Patent No.: US 8,667,521 B2
(45) Date of Patent: *Mar. 4, 2014

(54) IDENTIFYING EVENTS OF INTEREST WITHIN VIDEO CONTENT

(75) Inventors: Harmannus Vandermolen, Sunnyvale, CA (US); Anthony Wiegering, Seattle, WA (US); Michael Sommers, Leesburg, VA (US); Scott J. Levine, Arlington, VA (US); Alexander Franco, Herndon, VA (US)

(73) Assignee: Bright Sun Technologies, San Francisco, CA (US)

( * ) Notice: Subject to any disclaimer, the term of this patent is extended or adjusted under 35 U.S.C. 154(b) by 400 days.

This patent is subject to a terminal disclaimer.

(21) Appl. No.: 12/623,647

(22) Filed: Nov. 23, 2009

(65) Prior Publication Data

US 2010/0071013 A1 Mar. 18, 2010

Related U.S. Application Data

(63) Continuation of application No. 11/538,620, filed on Oct. 4, 2006, now Pat. No. 7,624,416.

(60) Provisional application No. 60/820,026, filed on Jul. 21, 2006, provisional application No. 60/822,692, filed on Aug. 17, 2006.

(51) Int. Cl.
*H04H 60/32* (2008.01)

(52) U.S. Cl.
USPC ............... 725/14; 725/87; 725/110; 725/115; 386/241

(58) Field of Classification Search
None
See application file for complete search history.

(56) References Cited

U.S. PATENT DOCUMENTS

| 5,751,286 | A | 5/1998 | Barber et al. |
|---|---|---|---|
| 5,828,839 | A | 10/1998 | Moncreiff |
| 5,835,087 | A | 11/1998 | Herz et al. |
| 6,049,806 | A | 4/2000 | Crecine |
| 6,385,602 | B1 | 5/2002 | Tso et al. |
| 6,901,207 | B1 | 5/2005 | Watkins |
| 7,209,942 | B1 | 4/2007 | Hori et al. |
| 7,281,220 | B1 | 10/2007 | Rashkovskiy |
| 7,367,043 | B2 | 4/2008 | Dudkiewicz et al. |
| 7,440,976 | B2 | 10/2008 | Hart et al. |
| 7,624,416 | B1 | 11/2009 | Vandermolen et al. |

(Continued)

OTHER PUBLICATIONS

"estimate" definition, Oxford English Dictionary Online. Retrieved Aug. 13, 2012. http://oed.com/view/Entry/64582.*
"subjective" definition, Oxford English Dictionary Online. Retrieved Aug. 13, 2012. http://oed.com/view/Entry/192702.*
"anticipate" definition, Oxford English Dictionary Online. Retrieved Aug. 13, 2012. http://oed.com/view/Entry/8552.*

(Continued)

*Primary Examiner* — Bennett Ingvoldstad
(74) *Attorney, Agent, or Firm* — Fenwick & West LLP

(57) ABSTRACT

Instant messages sent by a viewer of a video while the video is perceivable to the viewer may be monitored. An event of interest occurring in the video may be identified based on the monitored instant messages. Metadata that describes the event of interest may be generated and assigned to the video. A request for video content associated with the video may be received from a user. An indexed collection of videos that includes the video may be searched for the requested video content. Based on the search, it may be determined that the video satisfies the user's request. The event of interest occurring in the video may be identified based on the metadata assigned to the video. User perception of a scene from the video that includes the event of interest may be enabled.

30 Claims, 20 Drawing Sheets

(56) References Cited

U.S. PATENT DOCUMENTS

| | | |
|---|---|---|
| 2002/0069218 A1 | 6/2002 | Sull et al. |
| 2002/0133506 A1* | 9/2002 | Yamato ..................... 707/104.1 |
| 2002/0133826 A1 | 9/2002 | Ohyama |
| 2002/0184336 A1 | 12/2002 | Rising |
| 2003/0093790 A1 | 5/2003 | Logan et al. |
| 2003/0235407 A1 | 12/2003 | Lord |
| 2004/0098754 A1 | 5/2004 | Vella et al. |
| 2004/0103429 A1* | 5/2004 | Carlucci et al. ................. 725/32 |
| 2005/0091694 A1 | 4/2005 | Rambo |
| 2005/0128361 A1 | 6/2005 | Li et al. |
| 2006/0167857 A1 | 7/2006 | Kraft et al. |
| 2006/0167864 A1 | 7/2006 | Bailey et al. |
| 2006/0218573 A1 | 9/2006 | Proebstel |
| 2006/0224552 A1 | 10/2006 | Riezler et al. |
| 2007/0005564 A1 | 1/2007 | Zehner |
| 2007/0300258 A1 | 12/2007 | O Connor et al. |
| 2008/0005118 A1 | 1/2008 | Shakib et al. |
| 2008/0155627 A1 | 6/2008 | O Connor et al. |

OTHER PUBLICATIONS

Agichtein et al. "Improving Web Search Ranking by Incorporating User Behavior Information", SIGIR '06, Aug. 6-11, 2006. Seattle, Washington, USA Copyright 2006 ACM.

International Search Report issued in International Application No. PCT/US07/73999, dated Jul. 7, 2008, 8 pages.

Joho et al. "Effectiveness of Additional Representations for the Search Result Presentation of the Web", Joho, H. and Jose, J. M. (2005). A Comparative Study of the Effectiveness of Search Results Presentation on the Web. In: Lalmas, M., et al. (Eds.) Advances in Information Retrieval, 28th European Conference on Information Retrieval, pp. 302-313, L.

Lang "A tolerance rough set approach to clustering web search results" Institute of Mathematics Faculty of Mathematics, Informatics and Mechanics Warsaw University, Dec. 2003.

Non-Final Office Action for U.S. Appl. No. 11/548,055 dated Feb. 25, 2010, 22 pages.

* cited by examiner

IDENTIFYING EVENTS OF INTEREST WITHIN VIDEO CONTENT

CROSS REFERENCE TO RELATED APPLICATIONS

This application is a continuation of U.S. patent application Ser. No. 11/538,620, filed Oct. 4, 2006, now U.S. Pat. No. 7,624,416, which claims the benefit of U.S. Provisional Application No. 60/820,026, filed Jul. 21, 2006 and titled "Autotagging a Video Stream via IM Chat", and U.S. Provisional Application No. 60/822,692, filed Aug. 17, 2006 and titled "Identifying Events of Interest within Video Content", all of the prior applications are incorporated herein by reference in their entirety.

TECHNICAL FIELD

This description relates to identifying events of interest within video content.

BACKGROUND

Users are able to engage in real-time and non-real-time communications with one another over the Internet. Users may do so by sending instant messages or email messages back and forth across a data network through use of an instant messaging application or an email application, logging into a chat room on the Internet, leaving messages for one another on a bulletin board associated with a web page, sending audio messages using voice-over-IP (VoIP), or sending video messages. Users also may receive and view video content on the Internet via a data connection, from a broadcast source, or by accessing a storage medium on which the video content is stored. In some systems, a user is able to log into a web page to discuss real-time video content (e.g., a live television program) in a chat room associated with the video content.

SUMMARY

In a general aspect, instant messages sent by a viewer of a video while the video is perceivable to the viewer are monitored. An event of interest occurring in the video based on the monitored instant messages is identified. Metadata that describes the event of interest is generated. The metadata is assigned to the video.

With respect to at least the general aspect, implementations may include one or more of the following features. For example, monitoring the instant messages sent by a viewer may include monitoring instant messages sent by a viewer of a video to another viewer of the video while both viewers are concurrently viewing the video. Monitoring the instant messages sent by a viewer may include monitoring instant messages sent by a viewer of the video to a user who is not viewing the video.

Monitoring the instant messages sent by a viewer comprise monitoring the instant messages sent by a viewer subsequent to or concurrent with the occurrence of the event of interest in the video. Monitoring the instant messages may include monitoring instant messages that include a frame identifier that identifies a frame of the video. Monitoring instant messages that include a frame identifier may include monitoring instant messages that include a frame identifier that identifies the frame displayed to a viewer of the video at the time that the viewer initiates inputting an instant message to be subsequently sent as an instant message by a client system. Monitoring instant messages that include a frame identifier may include monitoring instant messages that include a frame identifier that identifies the frame displayed to a viewer of the video at the time that the viewer requests delivery of a message previously inputted by the viewer, the message being delivered as an instant message from a client system across a data network in response to the request.

Monitoring the instant messages sent by a viewer may include monitoring instant messages that include a video identifier that identifies the video.

Monitoring instant messages sent by a viewer may include receiving instant messages sent by a viewer. The received instant messages may be filtered based on a video identifier that identifies the video. Filtering the received instant messages based on the video identifier may include determining a category for the video identifier and filtering based on the determined category. Receiving instant messages sent by a viewer may include receiving text instant messages. Filtering the received instant messages based on the determined category may include determining one or more keywords associated with the category, analyzing text of a particular received instant message, determining whether the analyzed text includes the one or more keywords, storing the text of the particular received instant message and a frame identifier that is associated with the particular received instant message conditioned on the analyzed text including the one or more keywords, and discarding the particular received instant message conditioned on the analyzed text not including the one or more keywords.

Identifying an event of interest occurring in the video based on the monitored instant messages may include identifying a time span in the video as being associated with the event of interest if an aggregate number of monitored instant messages associated with times falling within the time span satisfy predetermined criteria. Identifying a time span in the video as being associated with the event of interest may include identifying a time span in the video as being associated with the event of interest if the aggregate number of monitored instant messages satisfies predetermined criteria. The aggregate number may be the total number of monitored instant messages associated with times falling within the time span.

Identifying a time span in the video may include identifying a time span having a duration that is determined based on a video identifier that identifies the video. Identifying a time span in the video may include identifying a time span having a duration that is an estimate of a duration of time that the viewers are expected to discuss the event of interest through instant messaging while perceiving the video.

The aggregate number of monitored instant messages may be stored with an indication of the time span. Generating metadata that describes the event of interest may include determining, based on the time span identified as being associated with the event of interest, a scene start time and a scene end time for a scene in the video that contains the event of interest, and including the scene start time and the scene end time in the metadata associated with the video, the metadata enabling the user to selectively view the scene in the video.

Determining a scene start time and a scene end time may include determining a beginning time for the time span identified as being associated with the event of interest, determining a scene start time based on the beginning time, and determining a scene end time based on the beginning time. Determining a scene start time may include determining, based on a video category corresponding to the video, an amount of time corresponding to a duration of an expected event of interest that is expected to occur in typical videos corresponding to the video category, rewinding the video by the amount of time from the beginning time, and marking the time at which the rewinding stops as a scene start time. Determining a scene end time may include fast forwarding the video from the beginning time by a predetermined amount of time, and marking the time at which the fast forwarding stops as a scene end time.

Identifying an event of interest occurring in a video based on the monitored instant messages may include receiving an indication the video has started and an identification of the viewers of the video, initializing a video clock, receiving instant messages sent by the viewers and assigning a time T0 to each instant message, where the time T0 may be a time of receipt of the instant message as indicated by the video clock, filtering the received instant messages, determining an instant message input curve, combining the instant message input curves for all received instant messages based on the time, and identifying the event of interest based on the combined curve.

Determining an instant message input curve may include determining a network delay, moving backwards from the time T0 by the network delay to a time T-1, determining an amount of typing time for the received instant message, moving backwards from T-1 by the amount of typing time to a time T-2, and determining an instant message input curve, wherein the instant message input curve may include a curve over an interval of time centered at T-2 that reflects a time at which a sender of the instant message began inputting the instant message.

The instant messages may be text-based messages.

A request for video content associated with the video may be received by a user. An indexed collection of videos, includes the video, may be searched for the requested video content. Based on the search, it may be determined that the video satisfies the user's request. The event of interest occurring in the video may be identified based on the metadata assigned to the video. User perception of a scene from the video that includes the event of interest may be enabled.

Searching an indexed collection of videos for the requested video content may include accessing a collection of videos that have been indexed based on metadata associated with the videos, where the metadata may include keywords describing the content included within the videos and categories to which the video content belongs, searching the indexed collection for the video content requested by the user, and identifying a video from within the collection that satisfies the user's request for video content and includes an event of interest.

Implementations of any of the techniques described may include a method or process, an apparatus or system, or computer software on a computer-accessible medium. The details of particular implementations are set forth below. Other features will be apparent from the description and drawings, and from the claims.

DETAILED DESCRIPTION

Figure 1:
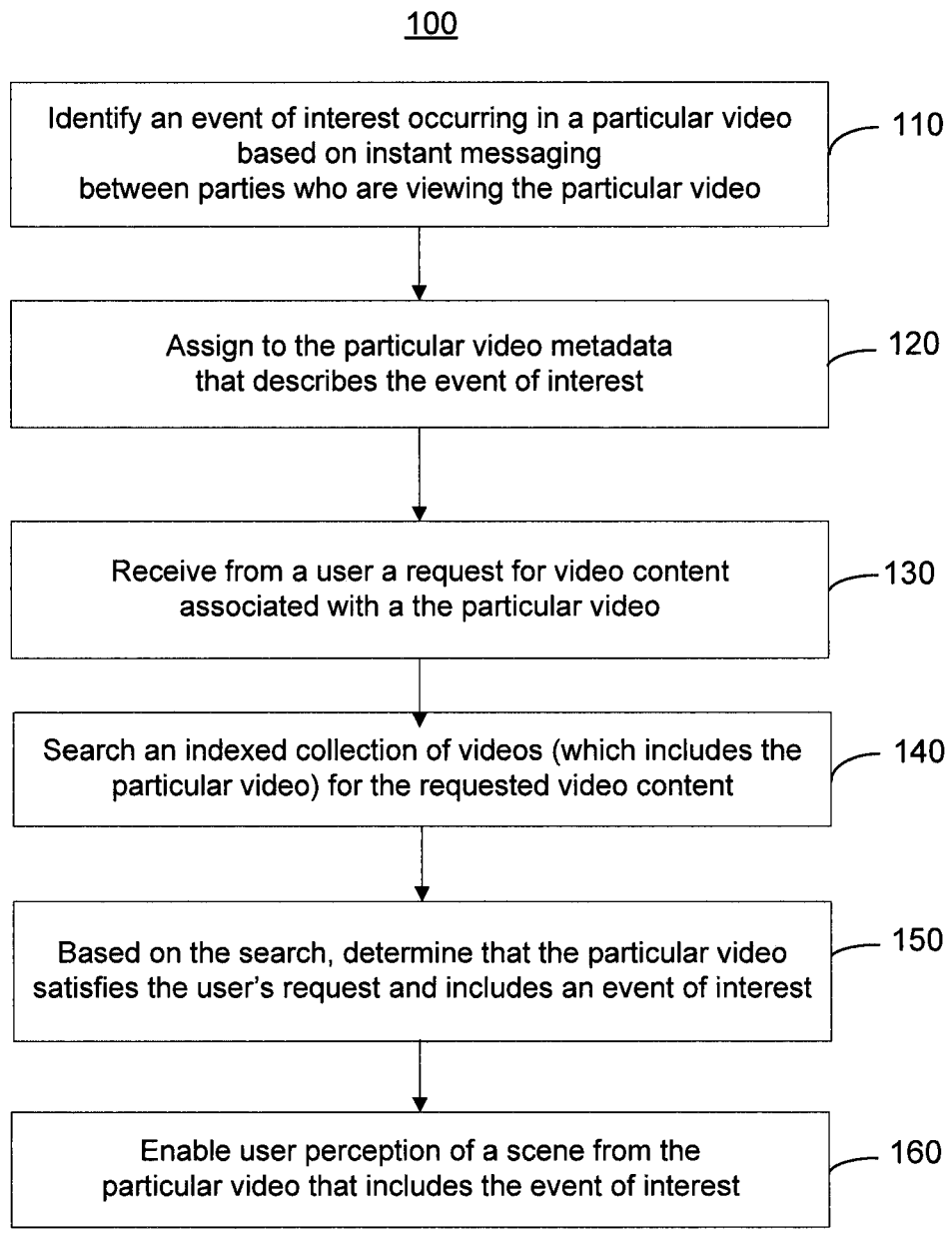
FIG. 1 is a flow chart of an exemplary process for providing a user with a scene from a video that includes an event of interest in response to a request from the user for video content related to the event of interest.

Instant messaging (IM) information may be used to improve audio and/or video search results. For example, IM information may be used to both identify and label key scenes in a video. Links to the key scenes then may be subsequently presented as search results in response to a search query related to the key scenes.

More precisely, two users may converse with one another during an IM communications session while the users view video content (or listen to audio content). An IM communications session includes private communications between two users that may be initiated, for example, by one user selecting an identifier (e.g., screen name) associated with another user from a contact or co-user list (e.g., a buddy list). An IM communications session is distinguishable from a chat communications session, which includes communications between multiple users (e.g., at least two users) through a chat user interface (e.g., a chat room). During a chat communications session, a first user may communicate with multiple other users concurrently by posting a communication which may be perceived by all of the multiple other users, and to which one or more of the multiple other users may respond.

The IM communications session may include a collection of text messages, audio messages (e.g., VoIP) or video messages (e.g., audio and video content). Each of the instant messages may be associated with a frame ID that represents, for example, a frame within video content that was currently displayed when a user began typing an instant message or, alternatively, when the user sent the instant message. Each of the instant messages also may be associated with a video ID that identifies the particular video that is being displayed to the user who sent the instant message and, presumably, about which the instant message includes content. Content within instant messages sent in connection with a video may be used to identify and label events of interest within the video.

An event of interest may be a portion of a video that includes content that is deemed to be significant to, for example, the overall content of the video, by one or more users. For example, a live concert, such as Live Aid, may be streamed to thousands of users. If a wardrobe malfunction occurs during the concert, a set of frames in the video during which that event happened, may include an event of interest.

For example, the IM communications session could be used to tag a key scene (e.g., an event of interest) based on both the content of the communications and the frequency of instant messaging between the users. Because the IM communications session occurs in real-time and tracks the displayed video, scenes in the displayed video may be tagged as important based on an amount of IM traffic occurring around the same time window as the scene. For example, if a large amount of IM traffic occurs at time 00:12:50-00:15:20, then the scene that occurs within a particular interval (e.g., 5 minutes) around this time period may be tagged as significant.

Moreover, the content of the instant messaging that occurred during this time period may be analyzed using, for example, text analysis to determine an appropriate label for the scene (e.g., if the term "funny" or its synonyms are used often during the IM communications session, the scene may be labeled as a comedic scene). If an instant message includes audio data, such as, for example, when the instant message is an audio instant message or an audio portion of a video message, speech-to-text conversation techniques may be performed prior to content analysis. If an instant message includes video data, such as, for example, when the instant message is a video message, facial expression and gesture analysis also may be performed prior to content analysis.

Instant messages that are not relevant to the video (e.g., instant messages that include information related to something other than the video) may be discarded. Instant messages that are relevant may be counted to determine if more than a threshold amount of IM traffic occurred during a particular time during the video to determine if the particular time includes an event of interest. Once identified, a set of frames that includes an event of interest may be used to generate a scene that captures the event of interest and provide video content to a user in response to a request for content that is associated with the video.

The process 100 of FIG. 1 is configured to provide a user with a scene from a video that includes an event of interest in response to a request from the user for video content related to the event of interest. For convenience, a generic online service provider (OSP) is referenced as performing the process 100. However, similar methodologies may be applied in other implementations where different components are used to define the structure of the system, or where the functionality is distributed differently among components in the system, as described in more detail below with respect to the systems shown in FIGS. 2 and 11.

The OSP identifies an event of interest occurring in a particular video based on instant messaging between parties who are viewing the particular video (110). An event of interest may be identified based on a number of relevant instant messages received, if the number exceeds a threshold amount. For example, during a particular time span (e.g., two seconds) of a video, 40 instant messages may be received by a central IM server. Of those 40 instant messages, only 35 may be relevant to the video. To be relevant, an instant message may include keywords that are associated with a category of the video. For example, the video may be a soccer match, and may belong to a "sports" category. The "sports" category may include keywords, such as, for example, "goal," "kick," "off sides" and "goalie." Instant messages that are not relevant to the video (e.g., do not include one or more keywords) may be discarded.

Instant messages that are relevant may be counted to determine a total number of instant messages received during the time span. For example, 35 of the received instant messages may be relevant to the video. The 35 instant messages may be compared to a threshold value (e.g., 33 instant messages). If the number of instant messages exceeds the threshold value, as in the present example, the time span may be deemed to include an event of interest.

The OSP assigns to the particular video metadata that describes the event of interest (120). A set of frames within the video, having a start and an end time, may be associated with the determined time span. As such, and in one implementation, metadata that describes the time span that includes the event of interest (as well as any other time spans within the video that include other events of interest) may be assigned to the video. More particularly, the metadata may be associated with a video ID that corresponds to the video by, for example, providing a pointer between the metadata and the video ID.

The OSP receives from a user a request for video content associated with the particular video (130). The request for content may include, for example, entry by the user into a video inbox associated with the user. A video inbox may include video content that is selected and stored for a user based on explicit user instructions (e.g., "save this video") or selected and stored automatically based on user preferences and interests as stored in a user interest profile (e.g., "sports" video are saved because a user profile indicates an interest in "sports"). The request for content also may include loading of a video content recommendation page.

In another example, the request for content may include a search query. Users may have difficulty expressing an information need in a search query that accurately reflects the information the user seeks. For example, a user may use broad terms in a search query when the user is actually seeking very specific information. As such, other information that has been collected and which relates to the search query, or content that may be responsive to the search query, may be used in addition to the terms within the search query itself to identify search results that are most likely to be responsive to not only the search query, but the user's true information need.

For example, a user may wish to find video of a fight that broke out during the last game of the 2006 World Cup. As such, the user may enter the search query "world cup." Without the benefit of additional information, search results ranging from final scores to a history of the sporting event may be returned in response to the search query. However, the OSP may receive the search query "world cup" and identify a video that is related to the search query. For example, a video of the 2006 World Cup finals match between France and Italy may be identified. Metadata associated with the identified video may be accessed to determine if there are any events of interest within the video. For example, the video may include an event of interest at the point where France player Zidane head-butted Italy player Materazzi. Existence of an event of interest within a video may indicate that a set of frames during which the event of interest occurred has been identified as significant to the video content as a whole. Thus, providing a user with a scene associated with the event of interest, in response to the search query, may be more likely to be responsive to the user's true information need, than merely providing search results that are only responsive to the broad search query provided by the user.

As such, the OSP searches an indexed collection of videos (which includes the particular video) for the requested video content (140). The collection of videos may be indexed based on metadata associated with the videos. A search of the metadata for the requested content results in identification of one or more videos that satisfies the requested content. For example, the OSP may identify a video of the France-Italy world cup soccer game as a video that satisfies the user's request for video content related to the query "world cup."

Based on the search, the OSP determines that the particular video satisfies the request for content and includes an event of interest (150). For example, if the user request is the search query "world cup," the OSP may search a collection of videos and identify a video of the 2006 World Cup finals match between France and Italy, which includes an event of interest (e.g., a fight scene).

The OSP enables user perception of a scene from the particular video that includes the event of interest (130). As described previously, a scene associated with an event of interest (identified by metadata associated with the identified video) may be returned to the user as a search result, and, thus, the OSP may enable user perception of the scene.

Figure 2:
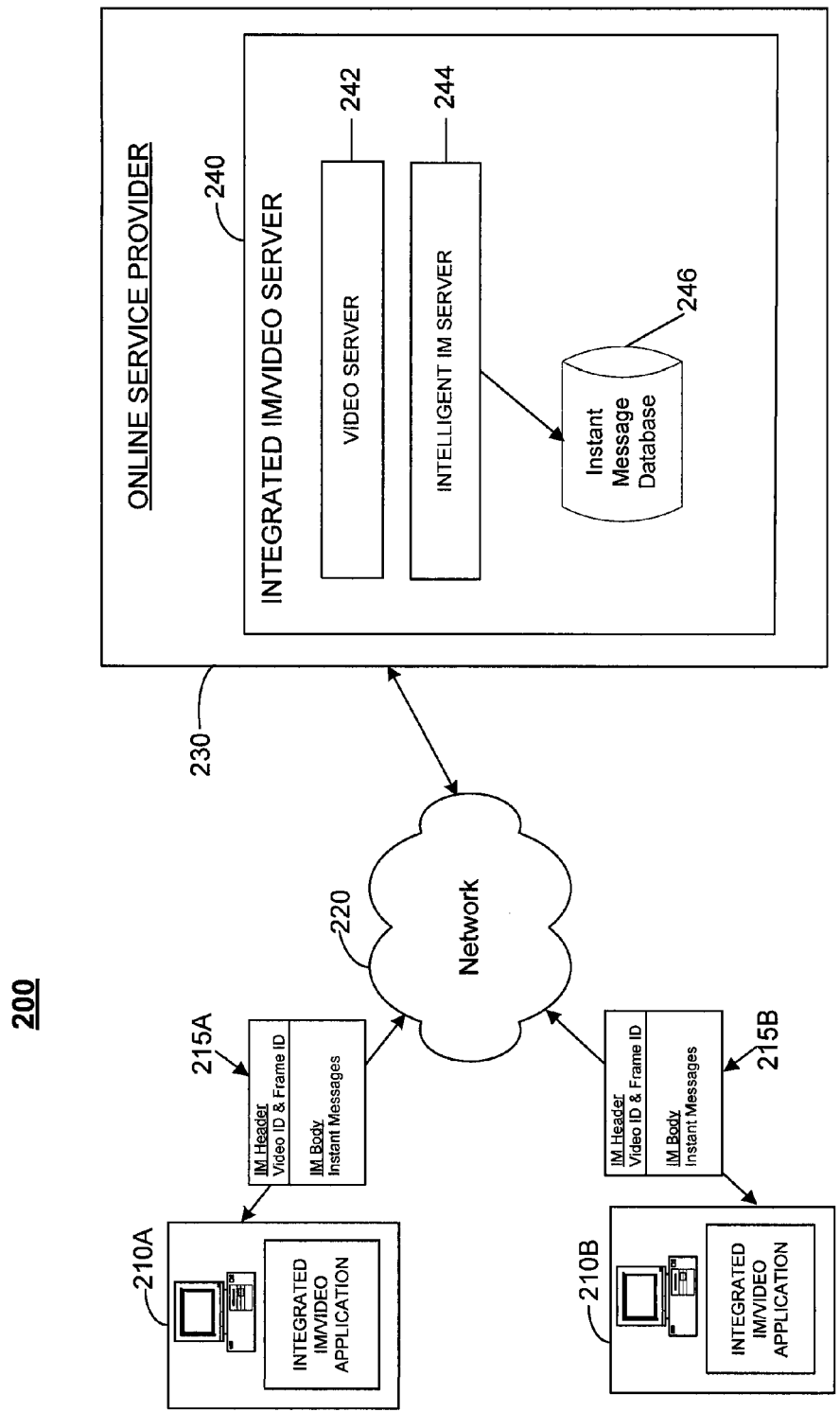
FIG. 2 is a block diagram of an exemplary communications system for identifying events of interest within a video, assigning metadata to the video that describe the events of interest, and providing video content to users based on the metadata.

A communications system 200 of FIG. 2 is configured to identify events of interest within a video, assign metadata to the video that describes the events of interest, and provide video content to users based on the metadata. The system 200, which may be referred to as an integrated system 200, includes a client 210A and a client 210B, both of which are configured to communicate with an online service provider (OSP) 230 over a network 220. Each of the client 210A and the client 210B includes an integrated instant messaging (IM)/video application. The OSP 230 includes integrated IM/video server 240, which itself includes a video server 242, an intelligent IM server 244 and an instant message database 246.

Each of the client 210A, the client 210B and the OSP 230 may be implemented by, for example, a general-purpose computer capable of responding to and executing instructions in a defined manner, a personal computer, a special-purpose computer, a workstation, a server, a device, a component, other equipment or some combination thereof capable of responding to and executing instructions. The client 210A, the client 210B and the OSP 230 may be configured to receive instructions from, for example, a software application, a program, a piece of code, a device, a computer, a computer system, or a combination thereof, which independently or collectively direct operations, as described herein. The instructions may be embodied permanently or temporarily in any type of machine, component, equipment, storage medium, or propagated signal that is capable of being delivered to the client 210A, the client 210B or the OSP 230.

The client 210A and the client 210B each may include one or more devices capable of accessing content on the OSP 230. The OSP 230 may include a general-purpose computer (e.g., a personal computer (PC)) capable of responding to and executing instructions in a defined manner, a workstation, a notebook computer, a PDA ("Personal Digital Assistant"), a wireless phone, a component, other equipment, or some combination of these items that is capable of responding to and executing instructions.

In one implementation, each of the client 210A and the client 210B includes one or more information retrieval software applications (e.g., a browser, a mail application, an instant messaging client, an Internet service provider client, a media player, or a web-enabled TV or other integrated client) capable of receiving one or more data units. More particularly, each of the client 210A and the client 210B includes an integrated IM/video application, for sending and receiving instant messages 215A and 215B, respectively, over the network 220, and also for receiving streaming video over the network 220 and displaying the video to a user. The information retrieval applications may run on a general-purpose operating system and a hardware platform that includes a general-purpose processor and specialized hardware for graphics, communications and/or other capabilities. In another implementation, each of the client 210A and the client 210B may include a wireless telephone running a micro-browser application on a reduced operating system with general purpose and specialized hardware capable of operating in mobile environments.

The network 220 includes hardware and/or software capable of enabling direct or indirect communications between the client 210A, the client 210B and the OSP 230. As such, the network 220 may include a direct link between each of the client 210A and the client 210B and the OSP 230, or it may include one or more networks or sub networks between them (not shown). Each network or sub network may include, for example, a wired or wireless data pathway capable of carrying and receiving data. Examples of the delivery network include the Internet, the World Wide Web, a WAN ("Wide Area Network"), a LAN ("Local Area Network"), analog or digital wired and wireless telephone networks, radio, television, cable, satellite, and/or any other delivery mechanism for carrying data.

The OSP 230 may include a general-purpose computer having a central processor unit (CPU), and memory/storage devices that store data and various programs such as an operating system and one or more application programs. Other examples of an OSP 230 includes a workstation, a server, a special purpose device or component, a broadcast system, other equipment, or some combination thereof capable of responding to and executing instructions in a defined manner. The OSP 230 also may include an input/output (I/O) device (e.g., video and audio input and conversion capability), and peripheral equipment such as a communications card or device (e.g., a modem or a network adapter) for exchanging data with the network 220.

The OSP 230 is generally capable of executing instructions under the command of a controller (not shown). The OSP 230 may be used to provide content to the client 210A and the client 210B. The controller may be implemented by a software application loaded on the OSP 230 for commanding and directing communications exchanged with the client 210A and the client 210B. Other examples of the controller include a program, a piece of code, an instruction, a device, a computer, a computer system, or a combination thereof, for independently or collectively instructing the client 210A and the client 210B or the OSP 230 to interact and operate as described. The OSP 230 may be embodied permanently or temporarily in any type of machine, component, physical or virtual equipment, storage medium, or propagated signal capable of providing instructions to the client 210A and the client 210B or the OSP 230.

More particularly, the OSP 230 includes integrated IM/video server 240. Server 240 includes a video server 242 and an intelligent IM server 244. The video server 242 may store and transmit streaming video associated with particular video content to one, or both, of the client 210A and the client 210B through the network 220. More particularly, the video server 242 may receive a request for content from one of the client 210A or the client 210B and, in response, may provide the clients 210A and 210B with video content that satisfies the request. The video server 242 may provide the video content by, for example, streaming. The video content may include a video ID and may be associated with a type that specifically describes the video content (e.g., "soccer game," "basketball game," or "football game") and/or a category that relates to the video content (e.g., "sports").

The OSP 230 also includes intelligent IM server 244. Intelligent IM server 244 is configured to allow users to send and receive instant messages, such as, for example, instant messages 215A and 215B. The intelligent IM server 244 may support associated services, such as administrative matters, advertising, directory services, chat, and interest groups related to the instant messaging. The intelligent IM server 244 has an architecture that enables each of the client 210A and the client 210B to communicate with one another. To transfer data, the intelligent IM server 244 employs one or more standard or exclusive IM protocols.

To begin an instant messaging session, the client 210A, for example, establishes a connection to a login server associated with intelligent IM server 244. The login server typically determines whether a user associated with the client 210A is authorized to access the intelligent IM server 244 by verifying a user identification and password. If the user is authorized to access the intelligent IM server 244, the login server employs a hashing technique on the user's screen name to identify a particular IM server associated with intelligent IM server 244 for use during the user's session. The login server provides the client 210A with the IP address of the particular IM server, gives the client 210A an encrypted key (e.g., a cookie or other type of key), and breaks the connection. The client 210A then uses the IP address to establish a connection to the particular IM server through the network 220, and obtains access to the IM server using the encrypted key.

Once a connection to the particular IM server has been established, the client 210A may directly or indirectly transmit data to and access content from the particular IM server. By accessing the particular IM server, a user associated with the client 210A can use the integrated IM/video application stored on the client 210A to view whether particular users are online, exchange instant messages with particular users, such as, for example, a user of the client 210B, participate in group chat rooms, trade files such as pictures, invitations or documents, find other users with similar interests, get customized news and stock quotes, and search the Web.

For purposes of illustration, users of the client 210A and the client 210B may be viewing the same video and may be engaging in an IM session where each of the users sends and receives instant messages that include content related to the video. However, in some instances, such as, for example, during transmission of a live event (e.g., a World Cup soccer game or a Live Aid concert), thousands of users may be viewing the real-time video and discussing the video during an IM session.

As such, intelligent IM server 244 is configured to receive instant messages 215A and 215B from the clients 210A and 210B. Each of the received instant messages 215A and 215B may include an IM header, which further includes a video ID, which identifies the video being viewed by the users of the clients 210A and 210B, and a frame ID that identifies a particular frame that was displayed when the user began typing the instant message or, alternatively, when the instant message was sent. If a received instant message is relevant to the video identified by the video ID, as described in more detail below, the intelligent IM server 244 may store text from within the instant message body, along with the video ID and frame ID, in instant message database 246. If a received instant message is not relevant, the intelligent IM server 244 may discard the instant message.

Intelligent IM server 244 is also configured to determine time spans within the video corresponding to the video ID that include events of interest. Intelligent IM server 244 may do so based on a number of relevant received instant messages, as also described in more detail below. Upon identification of events of interest within a video, the intelligent IM server 244 is configured to assign metadata that describes the identified events of interest to the video that corresponds to the video ID.

The OSP 230 may subsequently receive a request for content (e.g., entry into a video inbox or receipt of a search query) from a user associated with the video content. For example, a user may provide a search query for "world cup." The OSP 230 may be configured to determine a video that relates to the search query and access metadata associated with the video. From the metadata, the OSP 230 may determine a location for one or more events of interest and generate one or more scenes that capture the events of interest. The scenes may be made perceivable to the user in response to the request for content. In some implementations, the scenes may be previously cropped, stored by the OSP 230, and subsequently accessed in response to a content request.

In one implementation, scenes may be cropped by OSP 230 and provided as separate individual search results to the user. Additionally, or alternatively, a complete video associated with metadata may be provided as an individual search result. The metadata may inform the user of one or more scenes in the video that may be responsive to the user's content request, and may be used to enable the user to play back selected scenes, without requiring the user to view the video in its entirety.

Figure 3:
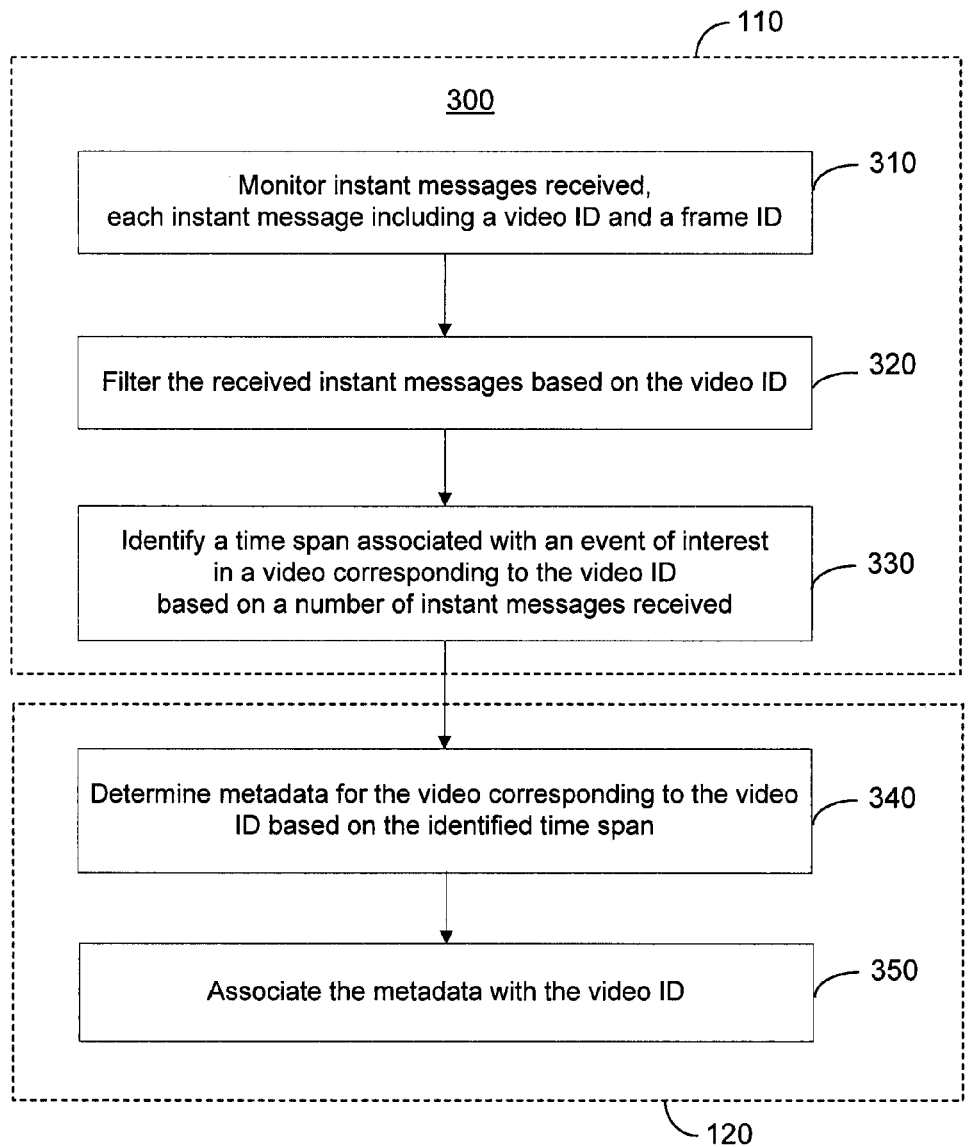
FIG. 3 is a flow chart of an exemplary process for associating metadata with a video stream.

The process 300 of FIG. 3 is configured to associate metadata with a video stream. Operations 310-330 of process 300 are an example of a set of processes for performing operation 110 of FIG. 1 and operations 340-350 of process 300 are an example of a set of processes for performing operation 120 of FIG. 1. For convenience, particular components described with respect to FIG. 2 are referenced as performing the process 300. However, similar methodologies may be applied in other implementations where different components are used to define the structure of the system, or where the functionality is distributed differently among the components shown by FIG. 2.

The intelligent IM server 244 monitors instant messages received from a client (e.g., one of the clients 210A or 210B of FIG. 2) (310). The instant messages received each include a video ID and a frame ID. The video ID may include an identifier that identifies a video that is being viewed by a user of the client from which the instant message was received. For example, a video ID for a Live Aid concert may be "LAC." The video is viewed by the user using an integrated IM/video application, which the user also uses to send and receive instant messages.

Video content is made up of many frames, and when a video is being viewed by a user, a frame may be displayed, for example, every 1/32 second (i.e., 32 frames per second). The frame ID may include an identifier that indicates a frame that was being shown to a user at the time the user began typing the received instant message. Alternatively, the frame ID may relate to a frame that was being shown when the user sent the received instant message. Frames within a video may be numbered sequentially, and thus a frame ID may include the sequential number of a frame relative to all other frames within the video. For example, a frame ID may be "F10" to represent a 10th frame.

The intelligent IM server 244 filters the received instant messages based on the video ID (320), as described in more detail below. The filtering allows the intelligent IM server 244 to discard received instant messages that are not relevant to the video corresponding to the video ID received with the instant message.

The intelligent IM server 244 identifies time spans associated with one or more events of interest in a video corresponding to the video ID based on a number of instant messages (330). For example, the intelligent IM server 244 may determine a number of relevant instant messages received during various time spans. If the number of instant messages received during a particular time span exceeds a threshold number, the time span may be deemed to include an event of interest.

The intelligent IM server 244 determines metadata based on the one or more time spans (340) and associates the metadata with the video ID (350). Information related to the identified time spans may be added to metadata and the metadata may be associated with the video ID. For example, a start time and end time of a time span may be included in the metadata in order to describe an event of interest.

Figure 4:
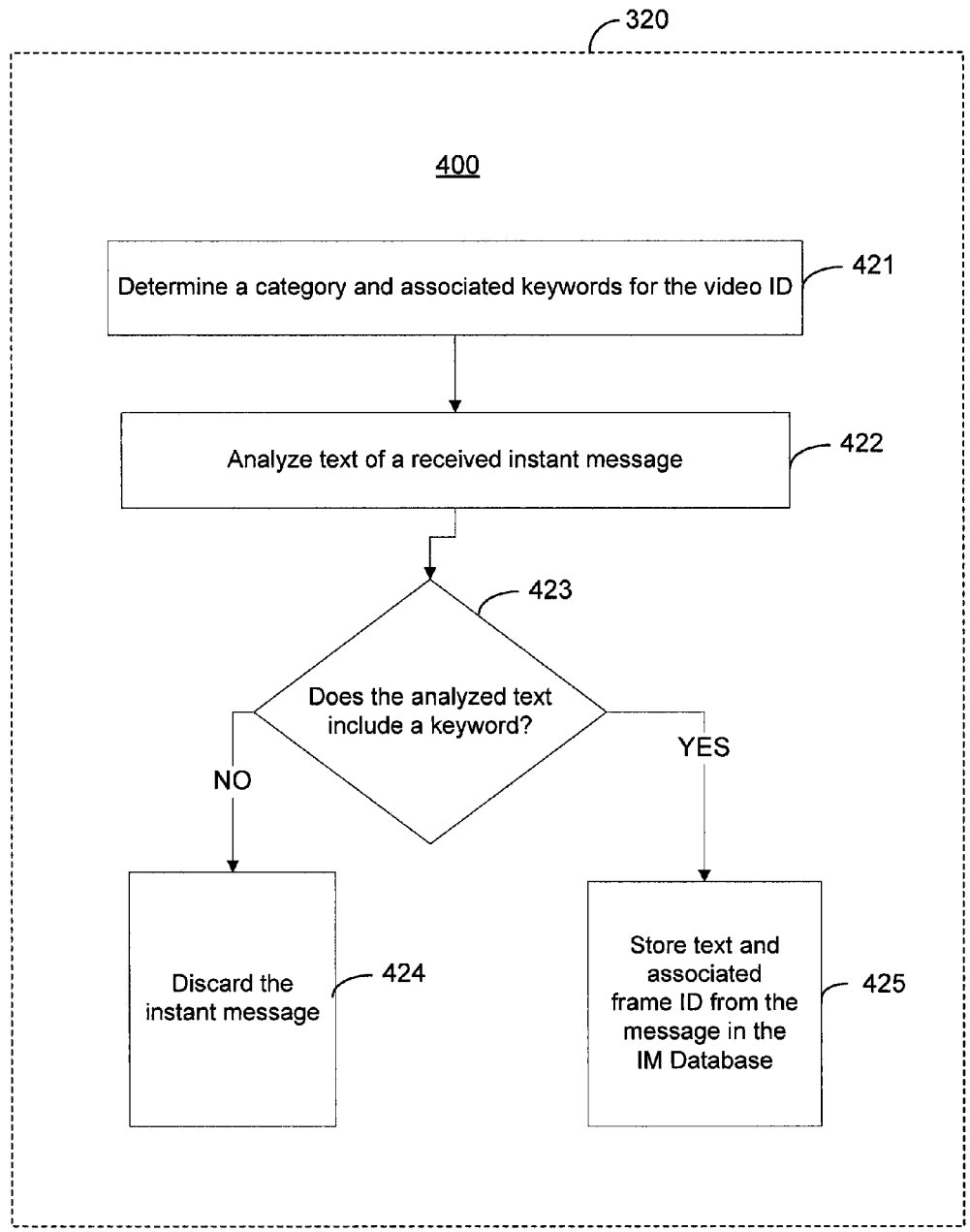
FIG. 4 is a flow chart of an exemplary process for identifying instant messages that are relevant to video content.

The process 400 of FIG. 4 is configured to identify instant messages that are relevant to video content. Process 400 is an example of a process for performing operation 320 of FIG. 3. For convenience, particular components described with respect to FIG. 2 are referenced as performing the process 400. However, similar methodologies may be applied in other implementations where different components are used to define the structure of the system, or where the functionality is distributed differently among the components shown by FIG. 2.

The intelligent IM server 244 determines a category and associated keywords for a video ID (421). For example, a video ID may correspond to a video of a World Cup soccer game. The intelligent IM server 244 may determine that the video of a World Cup soccer game belongs to a "sports" category, a "soccer" category, or both. The "sports" category may include keywords related to sports in general (e.g., "team," "player," "score," and "coach"), while the "soccer" category may include keywords that are related to the specific game of soccer (e.g., "goal," "off sides," "goalie," and "kick").

In some implementations, the video ID may include a category code. The category code may indicate a category to which the video belongs in addition to identifying particular video content. Alternatively, a category for video that corresponds to a video ID may be determined by looking up the video ID in a hash table or by analyzing metadata related to, and included within, the video associated with the video ID. In some implementations, a video may be associated with one or more categories.

The intelligent IM server 244 analyzes the text of a received instant message (422). If the received instant message is a text-based message, the intelligent IM server 244 may analyze the text directly. If the received instant message includes non-textual data, such as, for example, audio or video data, the intelligent IM server 244 may take further steps before analyzing the content of the instant message. For example, if the instant message includes audio data, the intelligent IM server 244 may use speech-to-text conversion to determine text that captures the content of the instant message. In another example, if the instant message includes video data, the intelligent IM server 244 may use gesture analysis or other methods to determine non-speech based content within the instant message. For example, a user of a video instant messaging application smiles. The intelligent IM server 244 may be configured to determine that a smile indicates "happy" content, and thus may include the word "happy" along with any other content received and determined from within the instant message.

The intelligent IM server 244 determines if the analyzed text includes a keyword (423). If the analyzed text from within a received instant message does not include one of the keywords associated with the determined category, the intelligent IM server 244 discards the instant message (424). If the analyzed text does include a keyword, the intelligent IM server 244 stores the text and associated frame ID (as received with the instant message) in IM database 246 of FIG. 2 (425).

Figure 5:
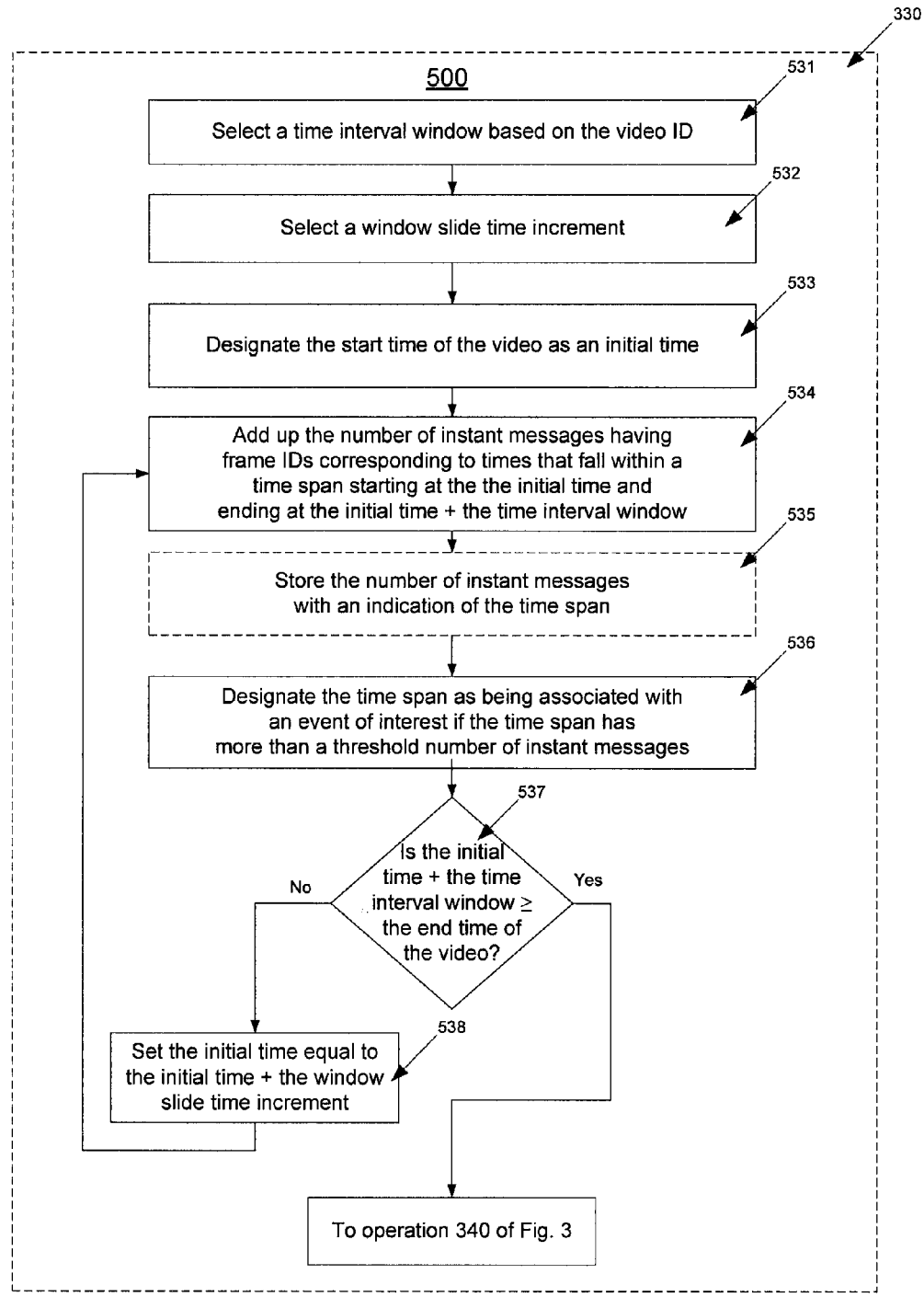
FIG. 5 is a flow chart of an exemplary process for identifying time spans associated with one or more events of interest in a video.

The process 500 of FIG. 5 is configured to identify time spans associated with one or more events of interest in a video. Process 500 is an example of a process for performing operation 330 of FIG. 3. For convenience, particular components described with respect to FIG. 2 are referenced as performing the process 500. However, similar methodologies may be applied in other implementations where different components are used to define the structure of the system, or where the functionality is distributed differently among the components shown by FIG. 2.

Figure 6:
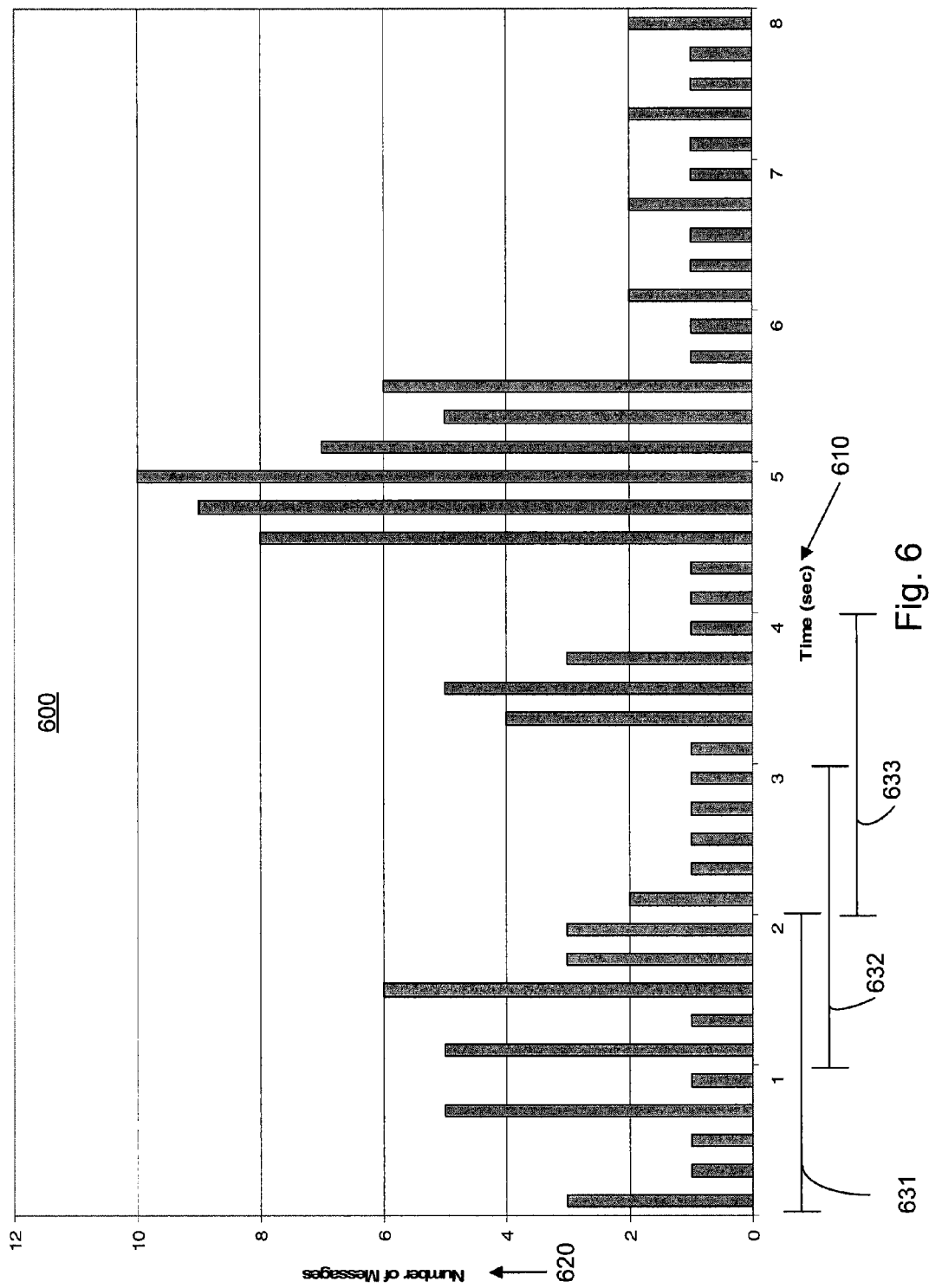
FIG. 6 is an illustration of a graph in which a number of instant messages is plotted against time.
Figure 7:
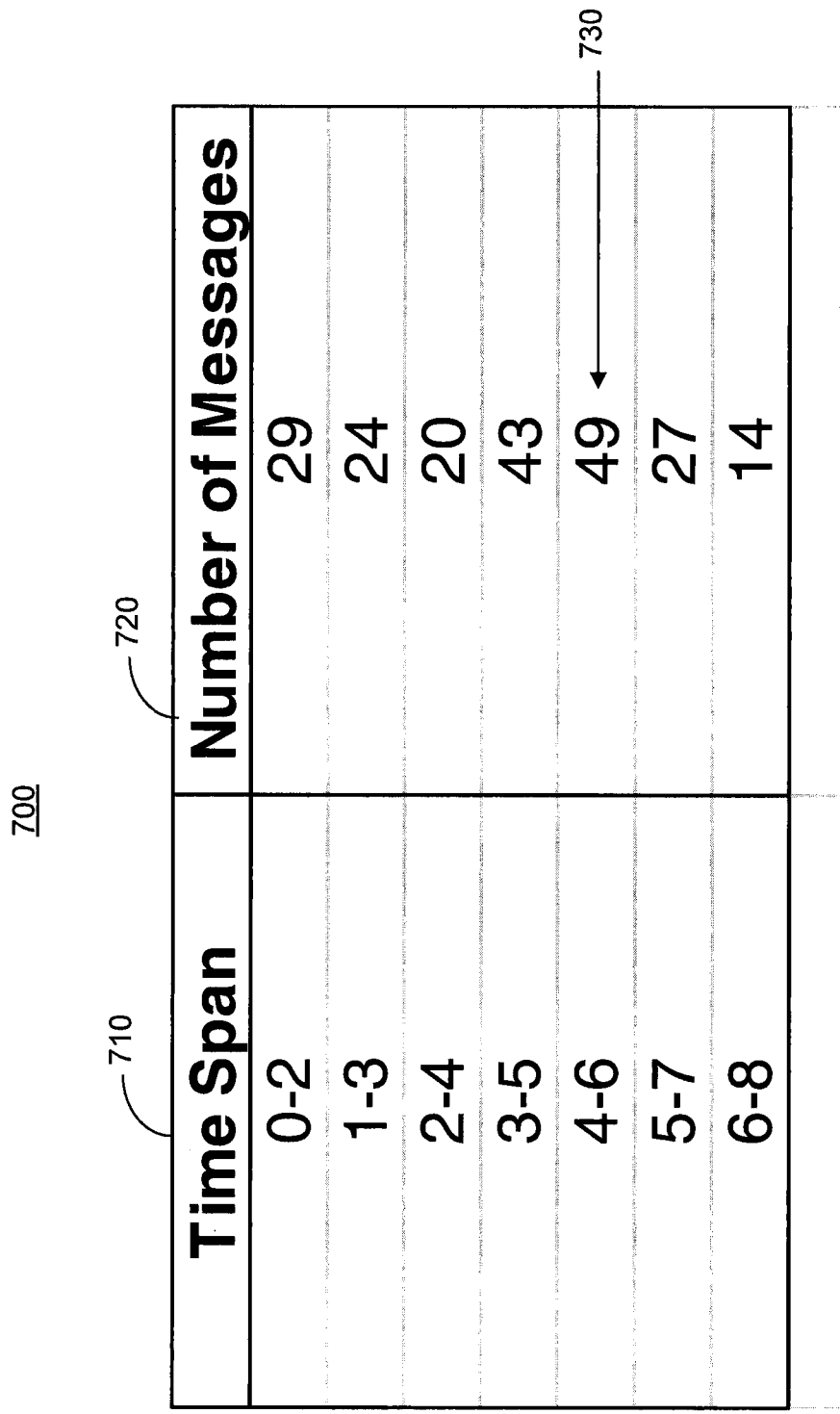
FIG. 7 is an illustration of a table that includes a number of instant messages received during various time spans.

Process 500 is described with reference to graph 600 and table 700 of FIGS. 6 and 7, respectively. Graph 600 of FIG. 6 illustrates a number of instant messages 620 being plotted against time in seconds 610. More particularly, graph 600 illustrates a number of instant messages received from a very large number of users during a broadcast of a live video, such as, for example, a Live Aid concert or World Cup soccer game. Graph 600 only includes a tally of instant messages that are relevant to the video, as non-relevant instant messages were previously filtered out. Table 700 of FIG. 7 includes a number of instant messages 720 received during various time spans 710 based on the information shown in graph 600.

The intelligent IM server 244 selects a time interval window based on the video ID (531). The time interval window may be related to a length of time after which users may discuss an event of interest. In the example of sporting events, users may discuss a soccer goal for longer than a basketball goal due to the speed of the game and the number of times during the game that a goal occurs. As such, the time interval window for a soccer game may be, for example, 2 minutes, while the time interval window for a basketball game may be, for example, 30 seconds. For simplicity and illustrative purposes, the time interval window, as represented in graph 600 by elements 631-633, is 2 seconds.

The intelligent IM server 244 selects a window slide time increment (532). The window slide time increment may be a predetermined value that is related to the time interval window. The window slide time increment relates to how many time spans are to be analyzed for a number of received instant messages. The smaller the window slide time increment, the more time spans that are analyzed. For example, if a time interval window is 2 minutes, the window slide time increment may be selected to be 10 seconds. In another example, if the time interval window is 30 seconds, the window slide time increment may be selected to be 5 seconds. In general, a smaller window slide time increment allows a more accurate identification of a time (or time span) at which an event of interest occurs. For simplicity and illustrative purposes, the window slide time increment, as represented in graph 600 by elements 631-633, is 1 second.

The intelligent IM server 244 designates the start time of a video as an initial time (533). An IM session that takes place before a video begins is not likely to be relevant to a particular event of interest within the video, and thus, it is not necessary for the intelligent IM server 244 to monitor instant messages received by the intelligent IM server 244 prior to the start of the video. However, the same may not be true for the end of a video and, in some implementations, the intelligent IM server 244 may continue to monitor instant messages received for a certain period of time (e.g., based on the time interval window) after the video has ended. For example, the initial time may be designated as time=0.

The intelligent IM server 244 adds up the number of instant messages having frame IDs that correspond to times that fall within a time span starting at the initial time and ending at the initial time plus the time interval window (534). In some implementations, the frame ID may represent a time at which a user started inputting an instant message. Alternatively, or additionally, the frame ID may represent a time at which a user caused an instant message to be sent from the user's client.

The addition performed during operation 534 may be integer addition if the number of instant messages received is discrete for a particular time span. However, and in some implementations, if the number of received instant messages is represented by a continuous curve, as described in more detail below, to add up the number of instant messages received during a time span, the area under the curve for that time span may be determined by, for example, integrating over the time span. For example, the initial time in graph 600 is time=0 and the time interval window is 2 seconds. The first time span is represented by element 631 and begins at time=0 and ends at time=2. As shown in the example of graph 600, there are 29 instant messages during the first time span that have frame IDs that fall within 0 and 2 seconds.

The intelligent IM server 244 optionally stores the number of instant messages with an indication of the time span (535). The number of instant messages and time span indications may be stored in a table, such as, for example, table 700 of FIG. 7. As shown in table 700, 29 instant messages exist during the time span that begins at time=0 and ends at time=2.

The intelligent IM server 244 designates the time span as being associated with an event of interest if the time span has more than a threshold number of instant messages (536). The intelligent IM server 244 may determine that a time span is related to an event of interest if a large number of instant messages are received during the time span. In one implementation, any time span that includes a number of instant messages that is greater than a threshold number of instant messages may be deemed to include an event of interest. If the threshold is, for example, 25 instant messages, the 0-2 second time span may be deemed to include an event of interest, along with time spans 3-5 seconds and 4-6 seconds. Alternatively, a single time span that has a highest number of instant messages may be deemed to include an event of interest. For example, the time span shown in table 700 that covers 4-6 seconds has the highest number of messages (i.e., 49 messages). The 4-6 seconds time span, therefore, may be deemed to include an event of interest. In another implementation, a predetermined number of time spans having the highest number of instant messages may each be deemed to include an event of interest. For example, the time spans with the two highest number of instant messages (e.g., the time spans in table 700 that cover 3-5 seconds and 4-6 seconds) may be deemed to each include an event of interest.

The intelligent IM server 244 determines if the initial time plus the time interval window is greater than or equal to the end time of the video (537). For example, for the time span of 0-2 seconds, the initial time is time=0, the time interval window is 2 seconds, and the end time of the video is time=8, as shown in graph 600. Thus, the initial time plus the time interval window is not greater than or equal to 8 seconds and the intelligent IM server 244 sets the initial time equal to the initial time plus the window slide time increment (538). For example, the initial time is time=0 and the window slide time increment is 1 second, so the initial time is set to time=1. The time span that begins at time=1 is represented by element 632 of graph 600.

Upon completion of operation 538, the intelligent IM server 244 continues to repeat operations 534-538 until the initial time plus the time interval window is greater than or equal to the end time of the video.

If the initial time plus the time interval window is greater than or equal to the end time of the video, such as, for example, when the initial time is time=6 and the time interval window is 2 seconds, such that the initial time plus the time interval window is 8, which is equal to the end time of the video, the intelligent IM server 244 ends process 500 and proceeds to operation 340 of FIG. 3.

Figure 8A:
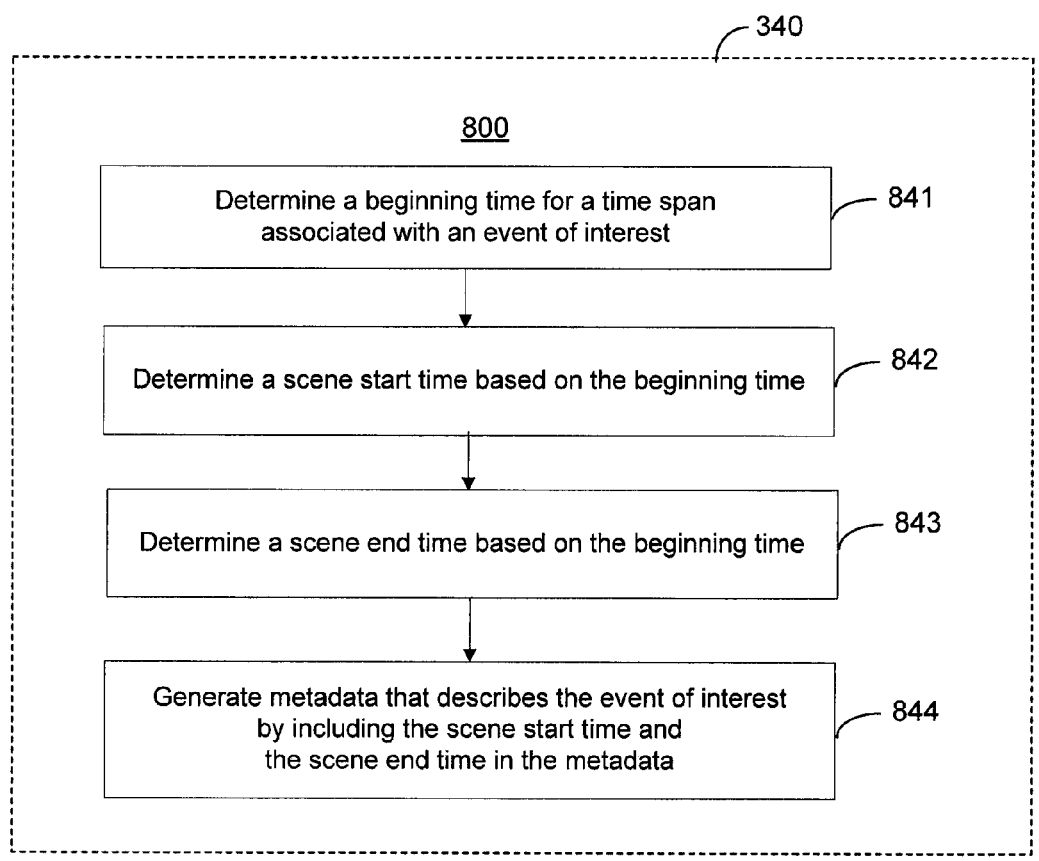
FIG. 8 is a flow chart of an exemplary process for generating metadata that describes one or more events of interest within a video.

The process 800 of FIG. 8A is configured to generate metadata that describes one or more events of interest within a video. Process 800 is an example of a process for performing operation 340 of FIG. 3. For convenience, particular components described with respect to FIG. 2 are referenced as performing the process 800. However, similar methodologies may be applied in other implementations where different components are used to define the structure of the system, or where the functionality is distributed differently among the components shown by FIG. 2.

The intelligent IM server 244 determines a beginning time for a time span associated with an event of interest (841). For example, a time span beginning at 90 seconds may have been deemed to include an event of interest during process 500.

Figure 8B:
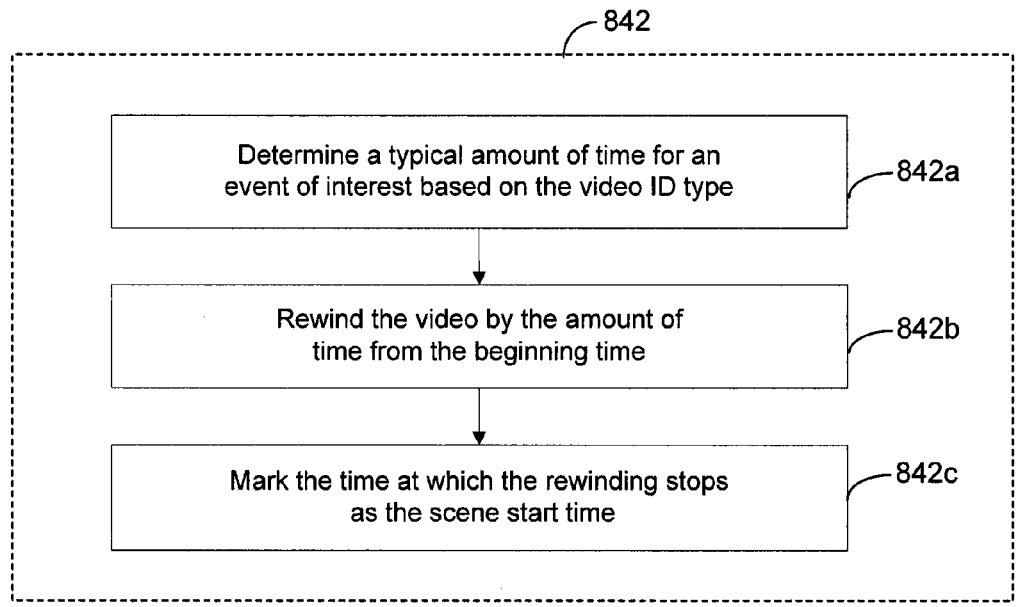

The intelligent IM server 244 determines a scene start time based on the beginning time (842). One example of a method for determining a scene start time is shown in FIG. 8B. However, additionally, or alternatively, other methods for determining a scene start time also may be used For example, the intelligent IM server 244 may determine a typical amount of time for an event of interest based on the video ID type (842*a*). Similar to the discussion above with respect to the time interval window, videos related to different types of events may include events of interest that last for different amounts of time. For example, a wardrobe malfunction during a concert may last 30 seconds, while a soccer goal may take up to 3 minutes from the time a team takes possession until the team scores a goal because it takes longer for scoring opportunities to develop in soccer, than in other sports. Thus, for a wardrobe malfunction, a typical amount of time for an event of interest may be 30 seconds, but for a soccer game, a typical amount of time for an event of interest may be 3 minutes. In some implementations, the typical amount of time may include any lead-up time that is related to the event of interest.

The intelligent IM server 244 may rewind the video by the amount of time from the beginning time (842*b*). In the present example, the beginning time is 90 seconds and the typical amount of time is 30 seconds. Thus, the intelligent IM server 244 rewinds the video to the 60 second mark. In some implementations, the amount of time by which the intelligent IM server 244 rewinds the video may factor in inaccuracies or errors in identifying a time span that is associated with an event of interest. For example, an event of interest may be so shocking or unexpected that users may not begin typing an instant message related to the event of interest until some time after the event has occurred. In this instance, the event of interest may have actually occurred earlier than that determined by the intelligent IM server 244. Thus, intelligent IM server 244 may rewind the video by the amount of time determined in operation 842*a* plus an additional amount of time to take into account potential inaccuracies or errors in identifying a time span for an event of interest.

The intelligent IM server 244 may mark the time at which the rewinding stops as the scene start time (842*c*). For example, the intelligent IM server 244 marks 60 seconds as the scene start time.

Figure 8C:
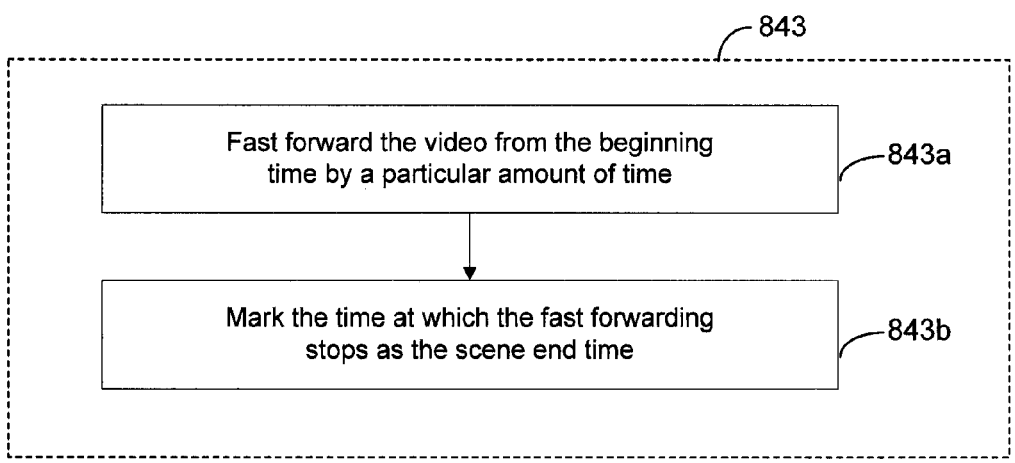

The intelligent IM server 244 determines a scene end time based on the beginning time (843). One example of a method for determining a scene end time is shown in FIG. 8C. Additionally or alternatively, however, other methods may be used to determine a scene end time.

For example, the intelligent IM server 244 may fast forward the video from the beginning time by a predetermined amount of time (843*a*). For example, a user may begin typing an instant message before an event of interest is complete. Thus, if the point at which the user began typing the instant message is used as the end point for the event of interest, the most interesting part of the event (e.g., the end) may be lost. Thus, a predetermined amount of time, depending on the video type, may be added to the event of interest to ensure that the end of the event of interest is not cut off. For example, the predetermined amount of time may be 5 seconds, and, thus, the intelligent IM server 244 may fast forward from the beginning time of 90 seconds by 5 seconds.

The intelligent IM server 244 may mark the time at which the fast forwarding stops as the scene end time (843*b*). For example, the intelligent IM server 244 marks 95 seconds as the scene end time.

The intelligent IM server 244 generates metadata that describes the event of interest by including the scene start time and the scene end time in metadata (844). For example, the scene start time of 60 seconds and the scene end time of 95 seconds may be stored in metadata associated with a video ID that corresponds to the video to which the instant messages are relevant.

In some implementations, statistical analysis may be used to determine a time interval window, a window slide time increment, a typing time, a typical amount of time for an event of interest and any additional amount of time chosen to correct for inaccuracies and/or errors in determining a time span for an event of interest for a particular video type. For example, the intelligent IM server 244 may perform monitoring of instant message conversations that are related to known events of interest to determine values for these variables that factor in real-life conditions. Doing so allows the values used by intelligent IM server 244 to be more accurate and to produce more accurate results.

Figure 9:
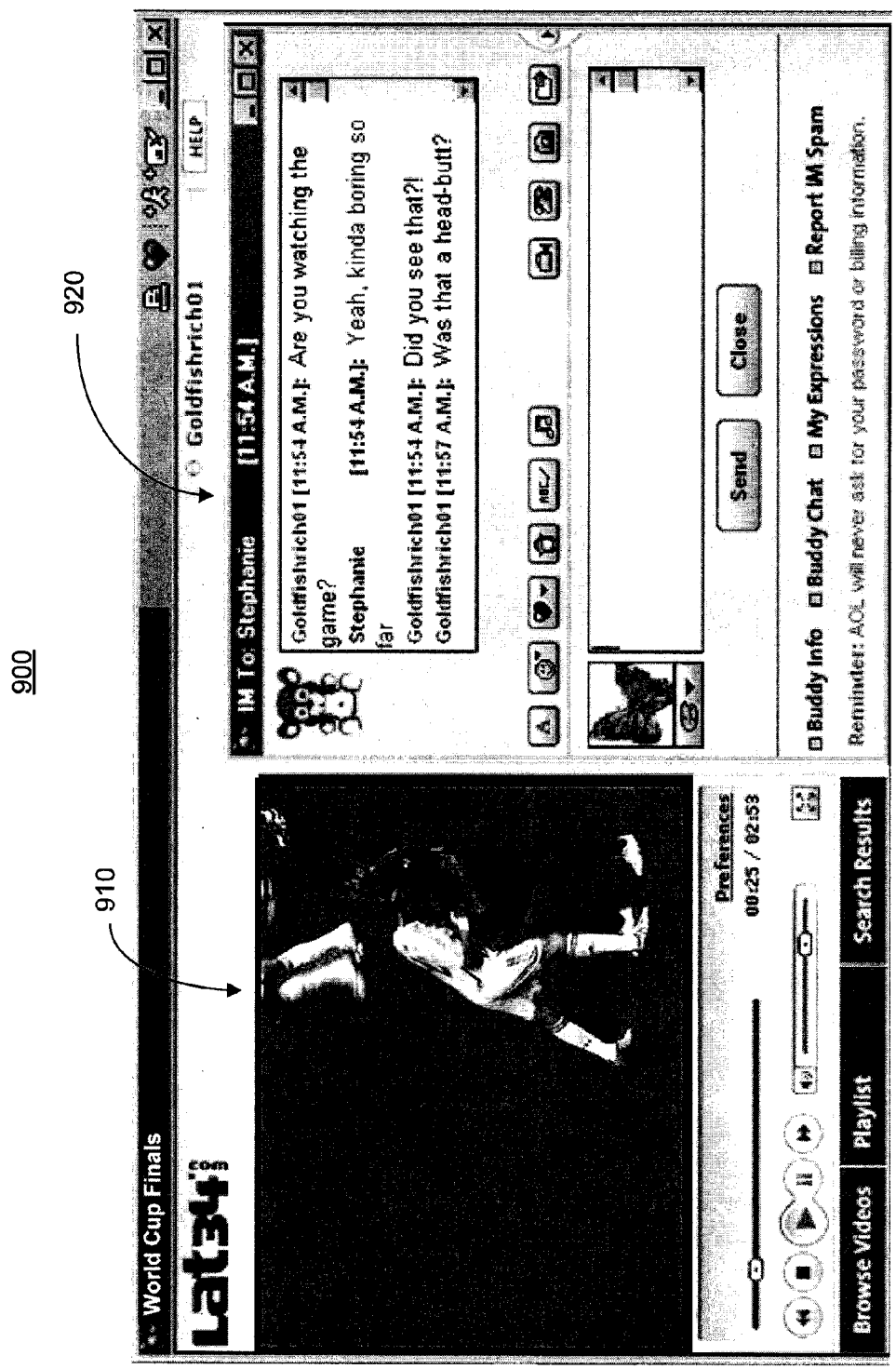
FIGS. 9 and 10 are illustrations of graphical user interfaces (GUIs) configured to allow a user to view video content and engage in an instant messaging (IM) communications session with another user using an integrated instant message/video application.
Figure 10:
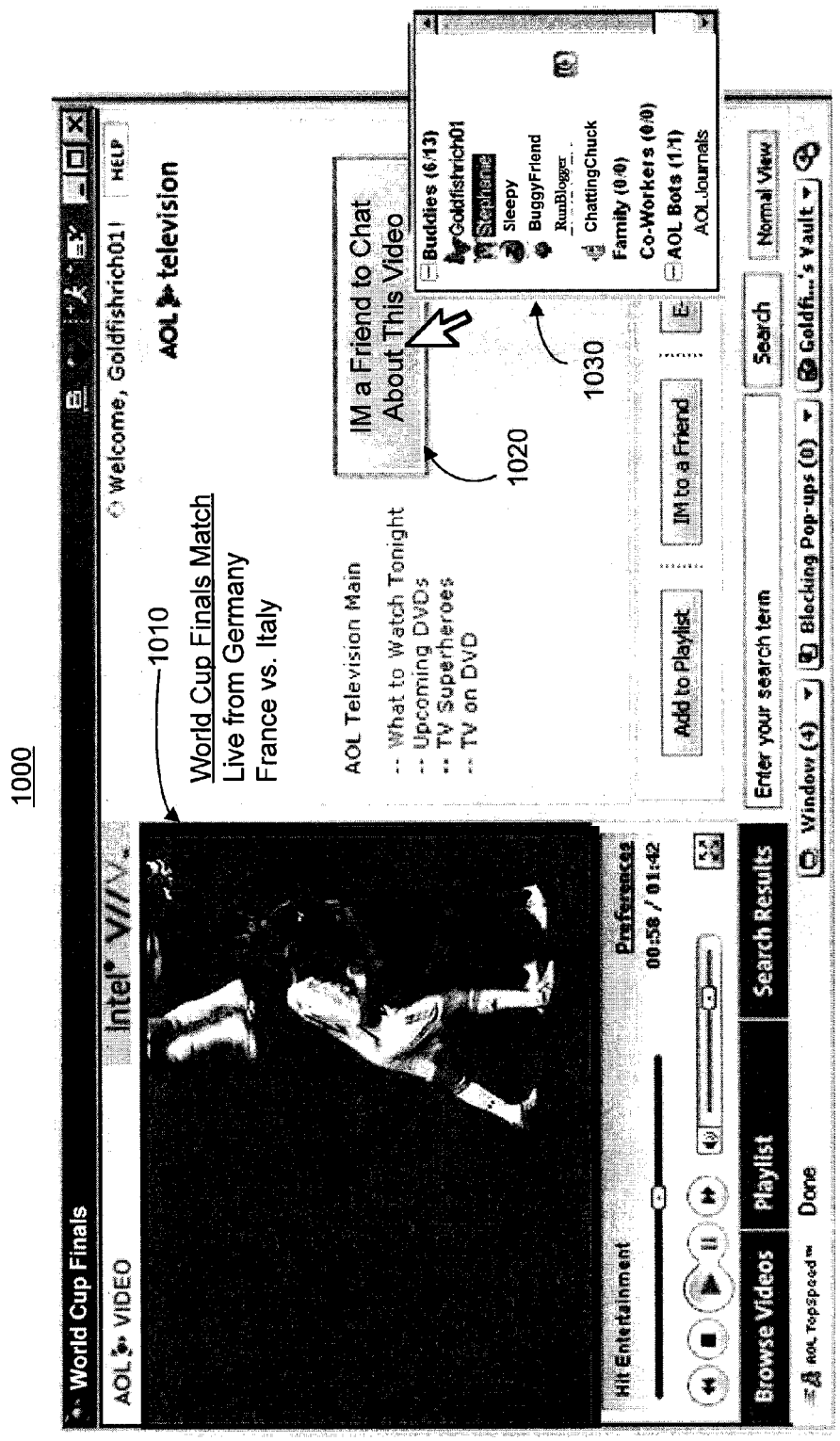

GUIs 900 and 1000 of FIGS. 9 and 10, respectively, are structured and arranged to allow a user to simultaneously view video content and engage in an IM communications session with another user using an integrated instant message/video application.

More particularly, GUI 900 is an integrated video-instant messaging GUI. GUI 900 includes video display 910 and IM window 920. As shown, video display 910 is presenting the final game of the 2006 World Cup and IM window 920 shows instant messages between user Goldfishrich01 and user Stephanie. For example, user Goldfishrich01 sends an instant message that includes the text "Are you watching the game?" and in response, user Stephanie sends an instant message that includes the text "Yeah, kinda boring so far."

GUI 1000 is also an integrated video-instant messaging GUI. GUI 1000 includes a video display 1010, which is currently presenting the final game of the 2006 World Cup. GUI 1000 also includes a graphical user interface element 1020 configured to allow a user to IM a friend to discuss the video being presented in video display 1010. Upon selection of element 1020, a drop-down menu or pop-up window 1030 appears and includes a list of other users with whom the user may initiate an IM session to discuss the World Cup video being presented in video display 1010.

Figure 11:
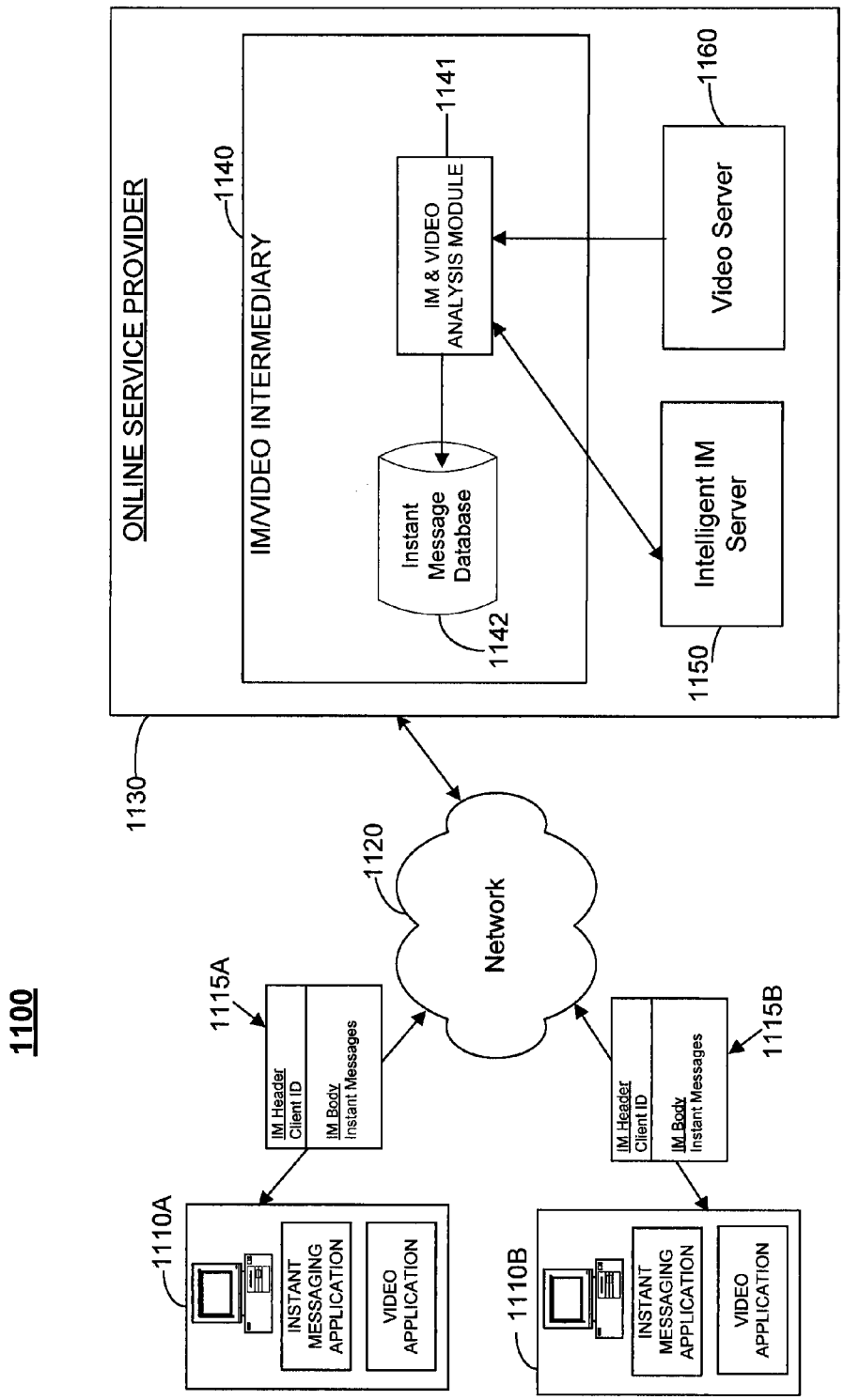
FIG. 11 is a block diagram of an exemplary communications system for identifying events of interest within a video, assigning metadata to the video that describes the events of interest, and providing video content to users based on the metadata.

Communications system 1100 of FIG. 11 is configured to identify events of interest within a video, assign metadata to the video that describes the events of interest, and provide video content to users based on the metadata in a manner that is different from that of integrated system 200 described above. The system 1100, which may be referred to as a non-integrated system 1100, includes a client 1110A and a client 1110B, both of which are configured to communicate with an online service provider (OSP) 1130 over a network 1120. Each of the client 1110A and the client 1110B includes an instant messaging application and a video application, which are not integrated with one another. The OSP 1130 includes IM/video intermediary 1140, which itself includes an IM and video analysis module 1141 and an instant message database 1142. The OSP 1130 also includes an intelligent IM server 1150 and a video server 1160.

Each of the client 1110A, the client 1110B and the OSP 1130 may be implemented by, for example, a general-purpose computer capable of responding to and executing instructions in a defined manner, a personal computer, a special-purpose computer, a workstation, a server, a device, a component, other equipment or some combination thereof capable of responding to and executing instructions. The client 1110A, the client 1110B and the OSP 1130 may be configured to receive instructions from, for example, a software application, a program, a piece of code, a device, a computer, a computer system, or a combination thereof, which independently or collectively direct operations, as described herein. The instructions may be embodied permanently or temporarily in any type of machine, component, equipment, storage medium, or propagated signal that is capable of being delivered to the client 1110A, the client 1110B or the OSP 1130.

The client 1110A and the client 1110B each may include one or more devices capable of accessing content on the OSP 1130. The OSP 1130 may include a general-purpose computer (e.g., a personal computer (PC)) capable of responding to and executing instructions in a defined manner, a workstation, a notebook computer, a PDA ("Personal Digital Assistant"), a wireless phone, a component, other equipment, or some combination of these items that is capable of responding to and executing instructions.

In one implementation, each of the client 1110A and the client 1110B includes one or more information retrieval software applications (e.g., a browser, a mail application, an instant messaging client, an Internet service provider client, a media player, or a web-enabled TV or other integrated client) capable of receiving one or more data units. More particularly, each of the client 1110A and the client 1110B includes an integrated IM/video application, for sending and receiving instant messages 1115A and 1115B over the network 1120, and also for receiving streaming video over the network 1120 and displaying the video to a user. The information retrieval applications may run on a general-purpose operating system and a hardware platform that includes a general-purpose processor and specialized hardware for graphics, communications and/or other capabilities. In another implementation, each of the client 1110A and the client 1110B may include a wireless telephone running a micro-browser application on a reduced operating system with general purpose and specialized hardware capable of operating in mobile environments.

The network 1120 includes hardware and/or software capable of enabling direct or indirect communications between the client 1110A, the client 1110B and the OSP 1130. As such, the network 1120 may include a direct link between each of the client 1110A and the client 1110B and the OSP 1130, or it may include one or more networks or sub networks between them (not shown). Each network or sub network may include, for example, a wired or wireless data pathway capable of carrying and receiving data. Examples of the delivery network include the Internet, the World Wide Web, a WAN ("Wide Area Network"), a LAN ("Local Area Network"), analog or digital wired and wireless telephone networks, radio, television, cable, satellite, and/or any other delivery mechanism for carrying data.

The OSP 1130 may include a general-purpose computer having a central processor unit (CPU), and memory/storage devices that store data and various programs such as an operating system and one or more application programs. Other examples of an OSP 1130 includes a workstation, a server, a special purpose device or component, a broadcast system, other equipment, or some combination thereof capable of responding to and executing instructions in a defined manner. The OSP 1130 also may include an input/output (I/O) device (e.g., video and audio input and conversion capability), and peripheral equipment such as a communications card or device (e.g., a modem or a network adapter) for exchanging data with the network 1120.

The OSP 1130 is generally capable of executing instructions under the command of a controller (not shown). The OSP 1130 may be used to provide content to the client 1110A and the client 1110B. The controller may be implemented by a software application loaded on the OSP 1130 for commanding and directing communications exchanged with the client 1110A and the client 1110B. Other examples of the controller include a program, a piece of code, an instruction, a device, a computer, a computer system, or a combination thereof, for independently or collectively instructing the client 1110A and the client 1110B or the OSP 1130 to interact and operate as described. The OSP 1130 may be embodied permanently or temporarily in any type of machine, component, physical or virtual equipment, storage medium, or propagated signal capable of providing instructions to the client 1110A and the client 1110B or the OSP 1130.

More particularly, the OSP 1130 includes the IM/video intermediary 1140. The IM/video intermediary 1140 is configured to analyze instant messages 1115A and 1115B that include content related to a video being transmitted to two or more clients (e.g., the client 1110A and the client 1110B) and are received from one of the two or more clients. More particularly, such analysis is performed by the IM and video analysis module 1141, as described below.

The OSP 1130 also includes the intelligent IM server 1150 and the video server 1160. The video server 1160 may store and transmit streaming video associated with particular video content to one, or both, of the client 1110A and the client 1110B through the network 1120. More particularly, the video server 1160 may receive a request for content from one, or both, of the client 1110A or the client 1110B and, in response, may provide the clients 1110A and 1110B with video content that satisfies the request. The video server 1160 may provide the video content by, for example, streaming. Upon transmission of the video content to the clients 1110A and 1110B, the video server 1160 may send an indication of the transmission to the analysis module 1141. The indication may include a video ID that identifies the video content being transmitted, as well as an identification of the clients to which the video server 1160 is transmitting the video.

In response to receiving information from video server 1160, the analysis module 1141 is configured to request a copy of instant messages 1115A and 1115B received by intelligent IM server 1150 from one of the clients identified by video server 1160. In some implementations, only clients that are sending instant messages may be monitored by the analysis module 1141 because it may be assumed that a user watching a live concert or sporting event unfold on video may be discussing the live content with another user, even if the other user is not viewing the live video. Alternatively, or additionally, when the video being transmitted by video system 1160 is not related to live content, such as, for example, when a small number of users are watching an on-demand movie or television show at the same time, which the users selected from a list of previously stored videos, it may be necessary to monitor instant messages that are both sent by a client that is receiving the video and received by a client that is also receiving the video. In such a scenario, an instant message sent or received by one of the clients receiving the video may include an IM header that contains an identification of the client (e.g., a client ID) from which the instant message has been sent or to which the instant message is to be received (as shown). Doing so may be beneficial to ensuring that instant messages copied by the intelligent IM server 1150, and sent to the analysis module 1141, are at least probably related to the video being transmitted to the clients.

The intelligent IM server 1150 is configured to allow users to send and receive instant messages 1115A and 1115B. The intelligent IM server 1150 may support associated services, such as administrative matters, advertising, directory services, chat, and interest groups related to the instant messaging. The intelligent IM server 1150 has an architecture that enables each of the client 1110A and the client 1110B to communicate with one another. To transfer data, the intelligent IM server 1150 employs one or more standard or exclusive IM protocols.

To begin an instant messaging session, the client 1110A, for example, establishes a connection to a login server associated with intelligent IM server 1150. The login server typically determines whether a user associated with the client 1110A is authorized to access the intelligent IM server 1150 by verifying a user identification and password. If the user is authorized to access the intelligent IM server 1150, the login server employs a hashing technique on the user's screen name to identify a particular IM server associated with intelligent IM server 1150 for use during the user's session. The login server provides the client 1110A with the IP address of the particular IM server, gives the client 1110A an encrypted key (e.g., a cookie or other type of key), and breaks the connection. The client 1110A then uses the IP address to establish a connection to the particular IM server through the network 220, and obtains access to the IM server using the encrypted key.

Once a connection to the particular IM server has been established, the client 1110A may directly or indirectly transmit data to and access content from the particular IM server. By accessing the particular IM server, a user associated with the client 1110A can use the integrated IM/video application stored on the client 1110A to view whether particular users are online, exchange instant messages with particular users, such as, for example, a user of the client 1110B, participate in group chat rooms, trade files such as pictures, invitations or documents, find other users with similar interests, get customized news and stock quotes, and search the Web.

As such, intelligent IM server 1150 is configured to receive instant messages from the clients 1110A and 1110B. If the clients 1110A and 1110B are receiving video from video server 1160, intelligent IM server 1150 may transmit copies of instant messages received by the client 1110A or the client 1110B to the analysis module 1141 in response to a request by the analysis module 1141 to do so.

If a received instant message is relevant to the video being transmitted by video server 1160 (and identified by the video ID), as described in more detail below, the analysis module 1141 may store text from within the instant message in instant message database 1142. If a received instant message is not relevant, the analysis module 1141 may discard the instant message.

The analysis module 1141 is also configured to determine time spans within the video corresponding to the video ID that include events of interest. The analysis module 1141 may do so based on a number of relevant received instant messages, as also described in more detail below. Upon identification of events of interest within a video, the analysis module 1141 is configured to assign metadata that describes the identified events of interest, to the video that corresponds to the video ID.

The OSP 1130 may subsequently receive a request for content (e.g., entry into a video inbox or receipt of a search query) from a user associated with the video content. For example, a user may provide a search query for "world cup." The OSP 1130 may be configured to determine a video that relates to the search query and access metadata associated with the video. From the metadata, the OSP 1130 may determine a location for one or more events of interest and generate a scene that captures the event of interest. The scene then may be provided to the user in response to the request for content. Such scenes may have been cropped and stored by the OSP 1130 prior to receipt of any content request.

In one implementation, scenes may be cropped by OSP 1130 and provided as separate individual search results to the user. Additionally, or alternatively, a complete video associated with metadata may be provided as an individual search result. The metadata may inform the user of a scene that may be responsive to the user's content request, and may be used to enable the user to play back selected scenes, without requiring the user to view the video in its entirety.

Figure 12:
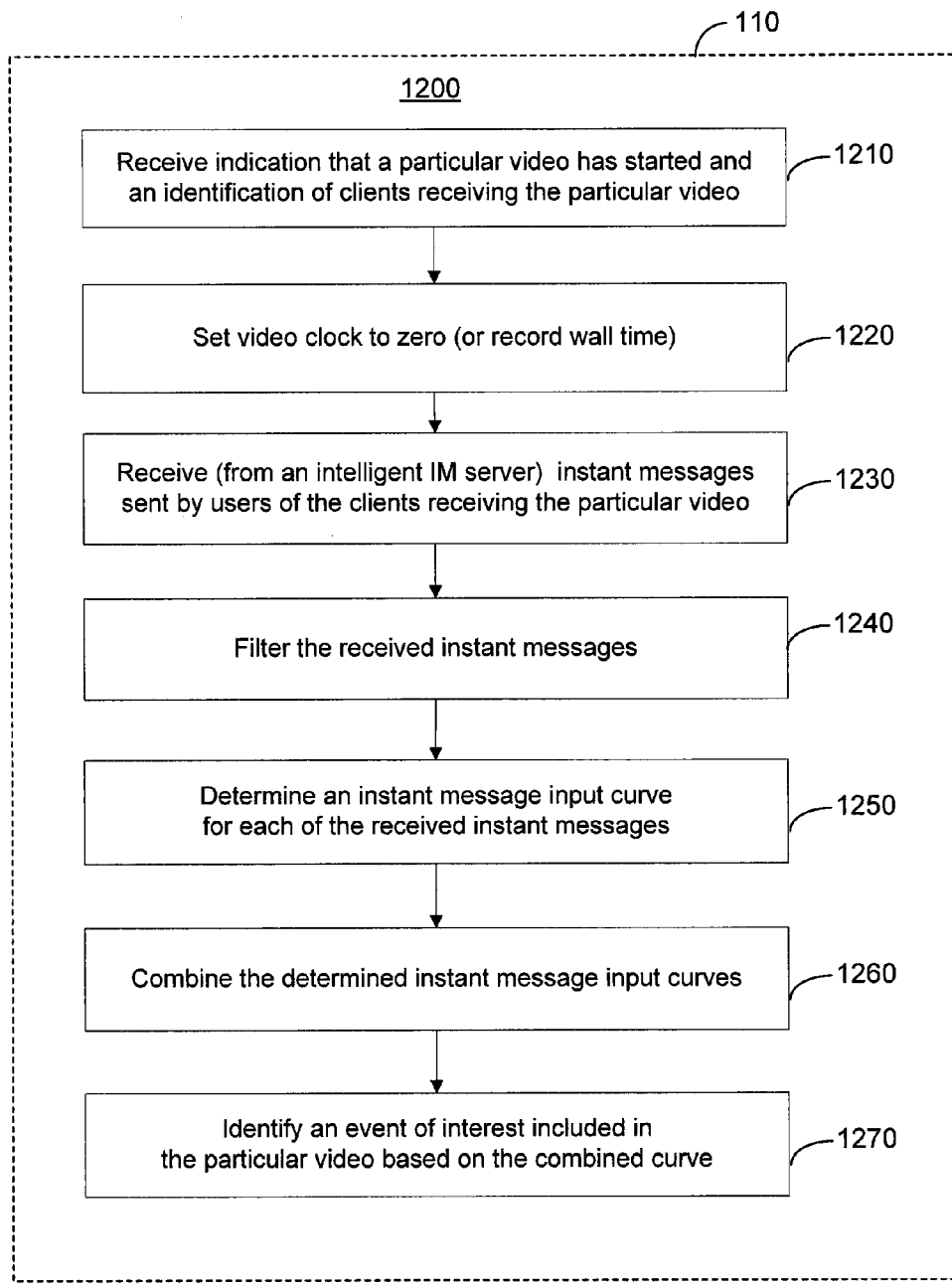
FIG. 12 is a flow chart of an exemplary process for associating metadata with a video stream.

The process 1200 of FIG. 12 is configured to associate metadata with a video stream. Process 1200 is an example of a process for performing operation 110 of FIG. 1. For convenience, particular components described with respect to FIG. 11 are referenced as performing the process 1200. However, similar methodologies may be applied in other implementations where different components are used to define the structure of the system, or where the functionality is distributed differently among the components shown by FIG. 11.

The analysis module 1141 receives an indication that a particular video has started and an identification of clients receiving the particular video (1210). For example, the video server 1160 may transmit a video to one or more clients, such as, for example, the clients 1110A and 1110B of FIG. 11. Upon the initiation of the transmission by the video server 1160, the video server 1160 may provide the analysis module 1141 with an indication that the video has started. In addition, and in some implementations, the video server 1160 may provide the analysis module 1141 with an identifier related to the video being transmitted (e.g., a video ID). The video server 1160 also provides the analysis module 1141 with an identification of clients receiving the video. In the present example, the analysis module 1141 may receive identifiers related to the client 1110A and the client 1110B. The identifiers may be, for example, screen names or identifiers associated with users of clients requesting the video. Additionally, or alternatively, the analysis module 1141 may receive such information in response to an inquiry sent by the analysis module 1141 to the video server, or directly to the clients receiving the video.

The analysis module 1141 sets a video clock to zero or records a current wall time (1220). Upon receiving the indication that the video has started, the analysis module 1141, in one implementation, sets a video clock to zero. In another implementation, rather than setting a video clock to zero, the analysis module 1141 may record a current time at which the video began, such as, for example, 8:00 AM. Thus, any activity that occurs after the video has started may be associated with the video based on a difference in time between the time of the activity and the time the video started.

The analysis module 1141 receives, from the intelligent IM server 1150, instant messages sent by the clients that are receiving the particular video (1230). As described above, upon receipt of the indication that the video has started from the video server 1160, the analysis module 1141 communicates the identifiers associated with the clients receiving the video to the intelligent IM server 1150 and requests copies of any instant messages received by the intelligent IM server 1150 from any one of the clients receiving the video. When the intelligent IM server 1150 receives such an instant message, the intelligent IM server 1150 sends a copy of the instant message (or, alternatively, the original instant message) to the analysis module 1141. In another implementation, the analysis module 1141 may communicate with the intelligent IM server 1150 to monitor the instant messages directly without requesting, or receiving, copies of the instant messages.

The analysis module 1141 filters the received instant messages (1240). The analysis module 1141 determines whether the received instant messages are relevant to the video that is being transmitted by the video server 1160. If an instant message is relevant, the analysis module 1141 stores the content of the instant message in the instant message database 1142. If an instant message is not relevant to the video, the analysis module 1141 may discard the instant message. To determine whether an instant message is relevant to a video, the analysis module 1141 may perform process 400 of FIG. 4, as described previously.

The analysis module 1141 determines an instant message input curve for each of the received instant messages (1250). The instant message input curve is a probability curve that represents an uncertainty of a time at which an instant message sender began inputting the instant message, as described in more detail below.

The analysis module 1141 combines the instant message input curves for all received (and relevant) instant messages (1260). The curves may be combined to form a single curve that represents an overall picture of instant messages sent from clients that were receiving the same video from the video server 1160 while the video was being displayed, as also described in more detail below.

The analysis module 1141 identifies an event of interest included in the particular video based on the combined curve (1270). Based on the combined curve, the analysis module 1141 may determine a number of instant messages that were input during various time spans, in a manner similar to that described above with respect to FIGS. 5-7. Time spans that include a large number of instant messages may be determined to include an event of interest, as also described above.

The analysis module 1141 determines metadata based on the combined curve and assigns the metadata to the video (1280). In some implementations, the metadata may include a begin time and an end time for a time span that has been deemed to be associated with an event of interest. Alternatively, or additionally, the metadata may include a start time and a stop time for a scene that captures an event of interest.

Figure 13:
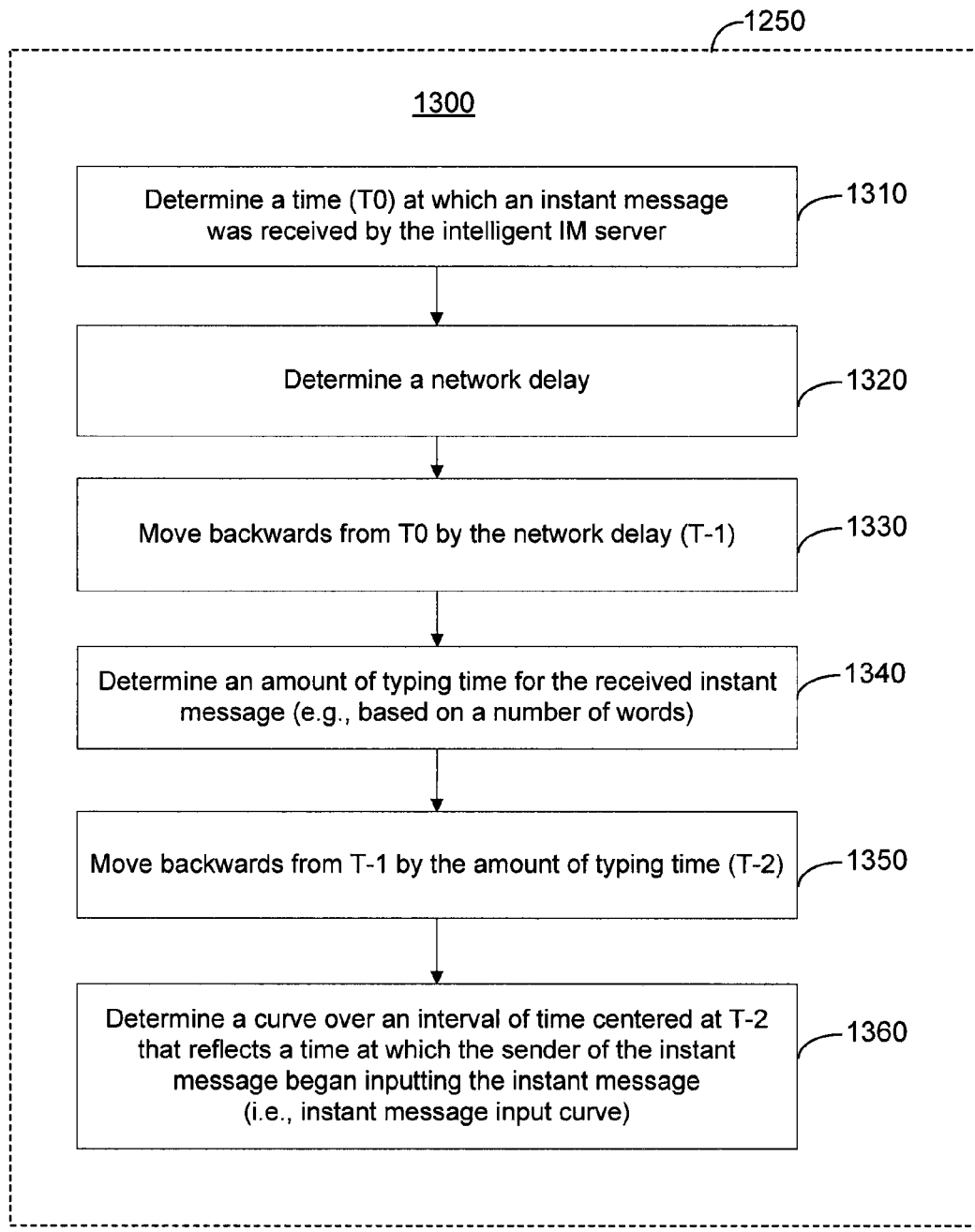
FIG. 13 is a flow chart of an exemplary process for generating an instant message input curve.
Figure 14:
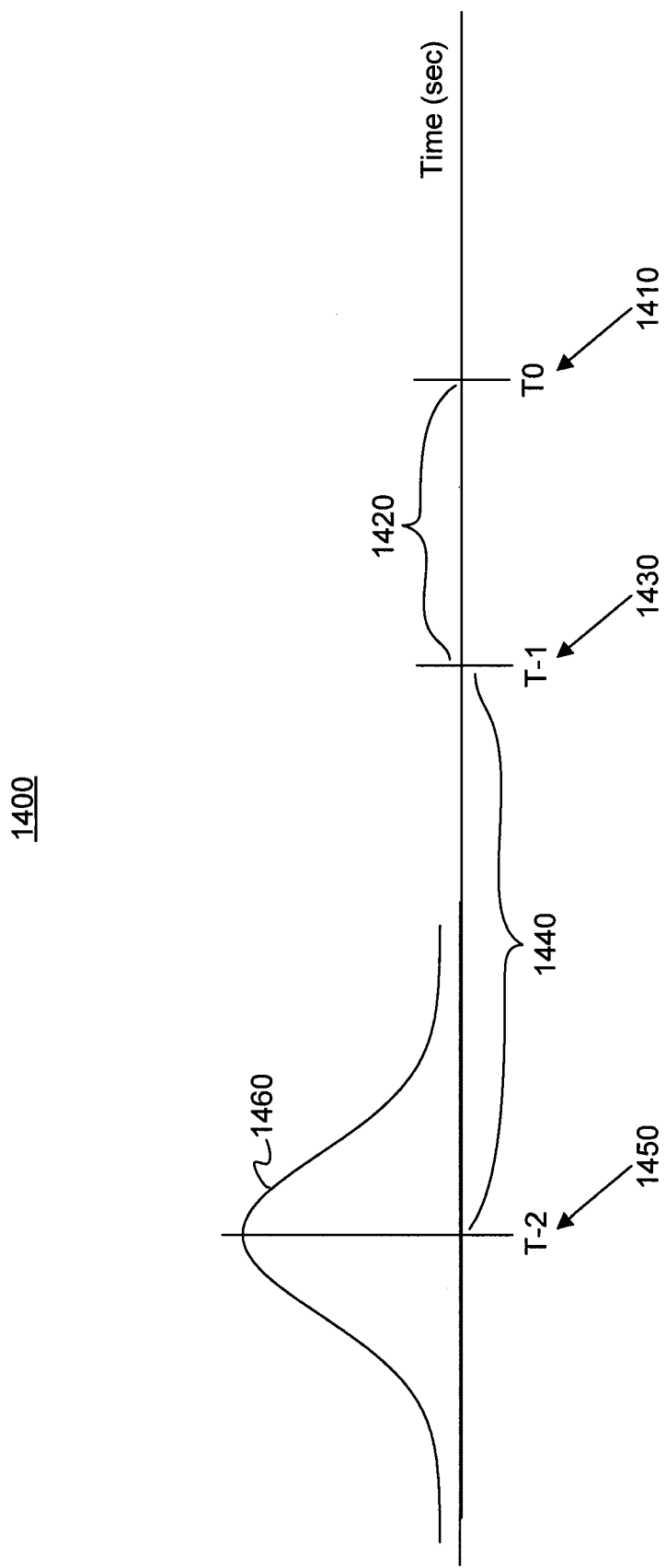
FIG. 14 is an illustration of a graph that may be used to determine a time at which a user began inputting an instant message.

The process 1300 of FIG. 13 is configured to generate an instant message input curve. Process 1300 is an example of a process for performing operation 1250 of FIG. 12. For convenience, particular components described with respect to FIG. 11 are referenced as performing the process 1300. However, similar methodologies may be applied in other implementations where different components are used to define the structure of the system, or where the functionality is distributed differently among the components shown by FIG. 11. Process 1300 is described with respect to graph 1400 of FIG. 14, which illustrates a determination of a time at which a user began inputting an instant message.

The analysis module 1141 determines a time (T0) at which an instant message was received by the intelligent IM server 1150 (1310). Time T0 is shown in graph 1400 by element 1410. For example, the intelligent IM server 1150 may include a time-received stamp or other indication for an instant message that is provided to the analysis module 1141. In some implementations, the analysis module 1141 may associate the time-received stamp with the video clock. For example, if the video clock began at 8:00 AM and the time-received stamp indicates the instant message was received at 8:45 AM, the analysis module 1141 may determine that the instant message was received 45 minutes into the video.

The analysis module 1141 determines a network delay (1320). The network delay, which is shown in graph 1400 by distance 1420, may represent an amount of time between a time at which a user sent an instant message (e.g., by pressing a "send" interface element or otherwise) and when the instant message was received by the intelligent IM server 1150. The network delay may be determined, for example, based on a type of connection between the client from which the instant message was received and characteristics of the OSP 1130 (e.g., dial-up or digital subscriber line (DSL)).

The analysis module 1141 moves backwards from T0 by the network delay (T-1) (1330). More particularly, the analysis module 1141 accesses the video to which the received instant message is relevant and locates a time in the video at which the instant message was received (e.g., T0). As described above, this may be accomplished based on a difference between the video clock start time and the time at which the instant message was received. After locating the time in the video when the instant message was received (i.e., T0), the analysis module 1141 may move backwards from T0 by the network delay, where T0 minus the network delay equals T-1.

The analysis module 1141 determines an amount of typing time for the received instant message (1340). The amount of typing time is represented by distance 1440 in graph 1400. In some implementations, a number of words included in the instant message may be used to determine an amount of typing time. For example, it may be assumed that, on average, a single word may be typed in 2/10 second. Thus, if the instant message includes 20 words, the amount of typing time may be 100 seconds or 1 minute and 40 seconds.

The analysis module 1141 moves backwards from T-1 by the amount of typing time (T-2) (1350). The analysis module 1141 accesses the time T-1 in the video and rewinds the video by the determined amount of typing time, such that T-1 minus the amount of typing time equals T-2. The time T-2, which is shown in graph 1400 by element 1450, may represent the time at which the user began inputting the instant message.

The analysis module 1141 determines a probability curve over an interval of time centered at T-2 that reflects a time at which the sender of the instant message began inputting the instant message (e.g., the analysis module 1141 determines an instant message input curve) (1360). As described above, the network delay and the amount of typing time may be determined based on various assumptions, such as, for example, that no additional network delays existed at the time the user sent the instant message, (thus causing the determined network delay to be inaccurate) and that it did not take the sender more or less time to type the instant message than the determined amount of typing time (thus causing the amount of typing time to be inaccurate). Therefore, the time determined as the time at which the user began inputting the instant message may not fall exactly at T-2. To compensate for this uncertainty, an instant message input curve 1460 may be formed centered at T-2. The curve is centered at T-2 due to a high level of confidence in the determination of T-2 as the time at which a sender began inputting an instant message. As shown at curve 1460, time value T-2 has a high probability of being the time at which the user began inputting the instant message, whereas the time values to the left and right of T-2 have an increasingly lower probability of being the time at which the user began inputting the instant message. The area under the instant message input curve 1460 is typically normalized to a value of one.

Figure 15:
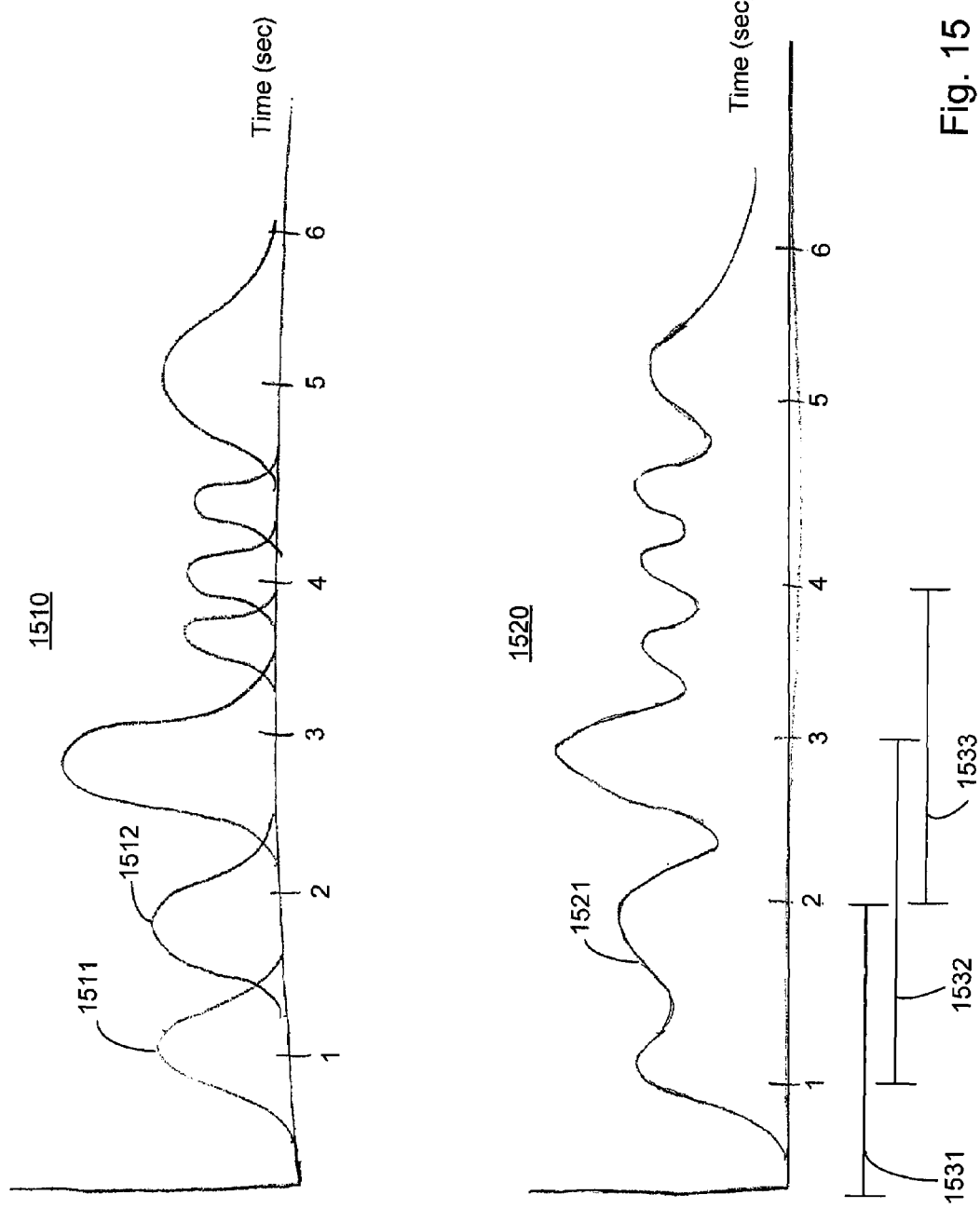
FIG. 15 is an illustration of multiple instant message input curves and a combined curve.

The multiple instant message input curves 1510 and the combined curve 1520 are shown in FIG. 15. An instant message input curve may be formed for each relevant instant message received by the analysis module 1141 using process 1300. As such, multiple instant message input curves may be plotted against time on a single graph 1510. Due to the uncertainty represented by an instant message input curve, plotting multiple instant message input curves on a single graph 1510 may cause the curves to overlap. For example, instant message input curves 1511 and 1512 overlap somewhere between 1 and 2 seconds.

Once each of the instant message input curves are plotted on graph 1510 for each relevant instant message received by the analysis module 1141, the curves may be combined to form combined graph 1520 during operation 1260 of FIG. 12. The curves may be combined by adding up each curve to create a single, combined curve 1521. Combined curve 1521 represents an overall picture of instant messages sent from clients that were receiving the same video from video server 1160.

One or more events of interest may be determined by the analysis module 1141 based on the combined curve 1521 during operation 1270 of FIG. 12. In one implementation, and similar to that described above with respect to FIGS. 5-7, time spans associated with one or more events of interest in a video may be identified by the analysis module 1141. To do so, the analysis module 1141 may (1) select a time interval window based on a video ID associated with the video, as shown by element 1531, (2) select a window slide time increment, a shown by the transition between elements 1531 and 532, as well as the transition between elements 1532 and 1533, (3) designate the start time of a video as an initial time (e.g., time=0), and (4) add up the number of instant messages likely input by a sender during various time spans to determine if a particular time span is associated with an event of interest. A time span may be deemed to be associated with an event of interest if the number of instant messages associated with the time span is larger than a threshold value, as described above.

Because combined curve 1521 is a continuous curve rather than a histograph, such as, for example, graph 600 of FIG. 6, to add up the number of instant messages received during a particular time span, the analysis module 1141 may determine the area under the combined curve 1521 over the particular time span. More particularly, the analysis module 1141 may determine the integral of the combined curve 1521 over the particular time span.

Once one or more time spans are deemed to be associated with an event of interest, the analysis module 1141 may determine metadata based on the combined curve (e.g., determined time spans), as described above with respect to operation 1280 of FIG. 12, and in a manner similar to that of process 800 of FIG. 8. The metadata may include a begin time and an end time for a time span that is associated with an event of interest. Alternatively, or additionally, the metadata may include a start time and a stop time for a scene generated to capture an event of interest.

In some implementations, rather than performing process 1300, as described with respect to graph 1400 and the curves 1510 and 1520, to determine when a user began inputting an instant message, and thus the location of an event of interest within a video, the instant messaging application of client 1110A or 1110B may identify a time at which a user started typing an instant message, or a delta between when the user began typing and the time at which the instant message was sent. The instant messaging application then may provide such information to the intelligent IM server 1150 by, for example, including the information with the sent instant message. As such, the analysis module 1141 may use the information regarding when the user began inputting the instant message to identify a begin time and an end time for a time span that is associated with an event of interest that is included in a video being viewed by the user who sent the instant message.

Figure 16:
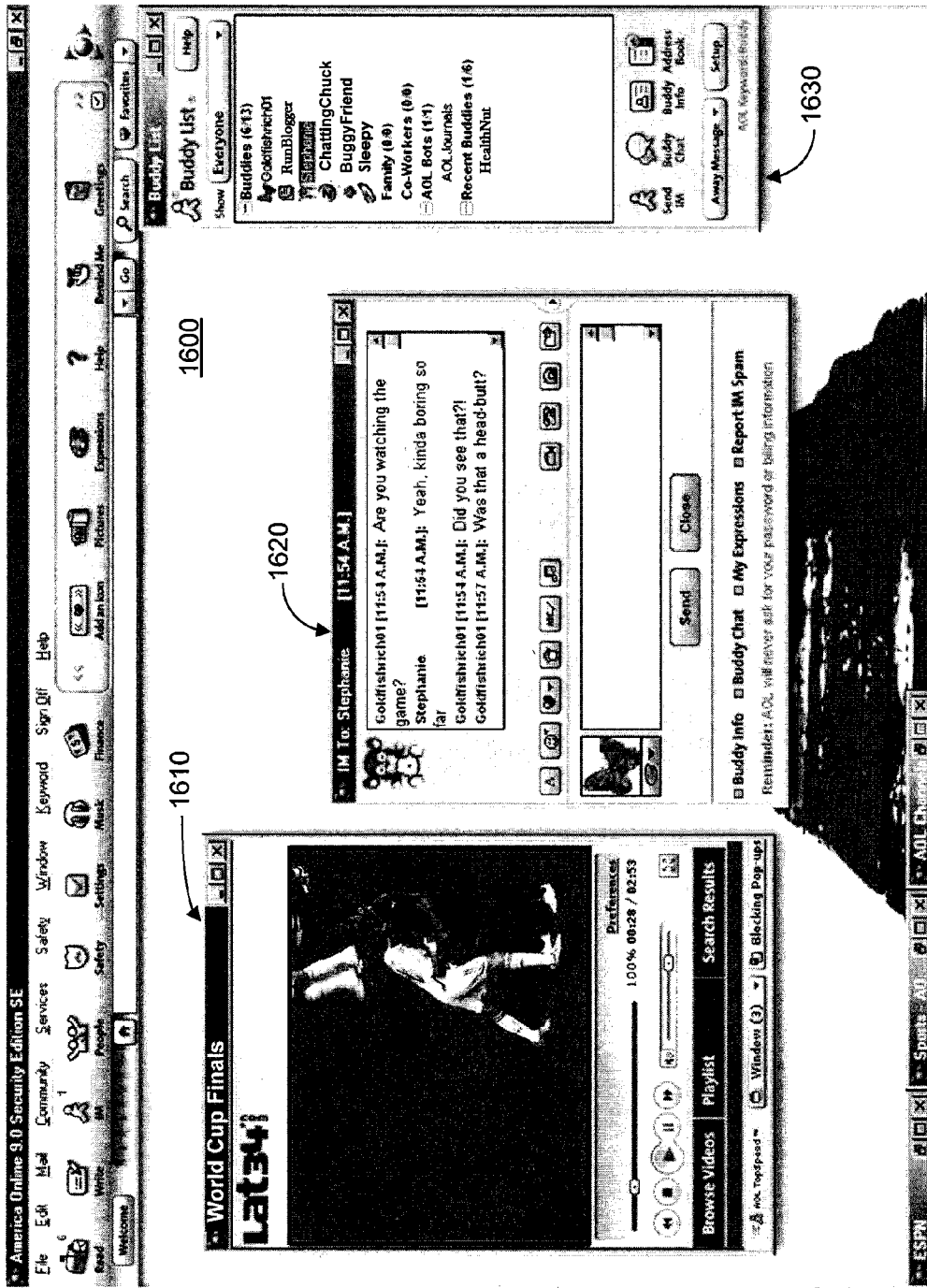
FIG. 16 is an illustration of a GUI configured to allow a user to simultaneously view video content using a video application and engage in an IM communications session with another user using an instant messaging application.

GUI 1600 of FIG. 16 is structured and arranged to allow a user to concurrently view video content using a video application and engage in an IM communications session with another user using an instant messaging application, where the two applications are not interrelated. GUI 1600 includes a video display 1610, IM window 1620 and contact list 1630. GUI 100 represents an online service provider display that includes multiple applications for receiving and transmitting various types of information. Similar to that shown in GUI 500, video display 1610 is presenting the final game of the 2006 World Cup and IM window 620 shows instant messages being sent between user Golffishrich01 and user Stephanie. GUI 1600 also includes contact list 630 which includes identifiers related to particular users with whom user Goldfishrich01 may initiate an IM session to discuss the video presented in video display 1610 or another matter.

Figure 17:
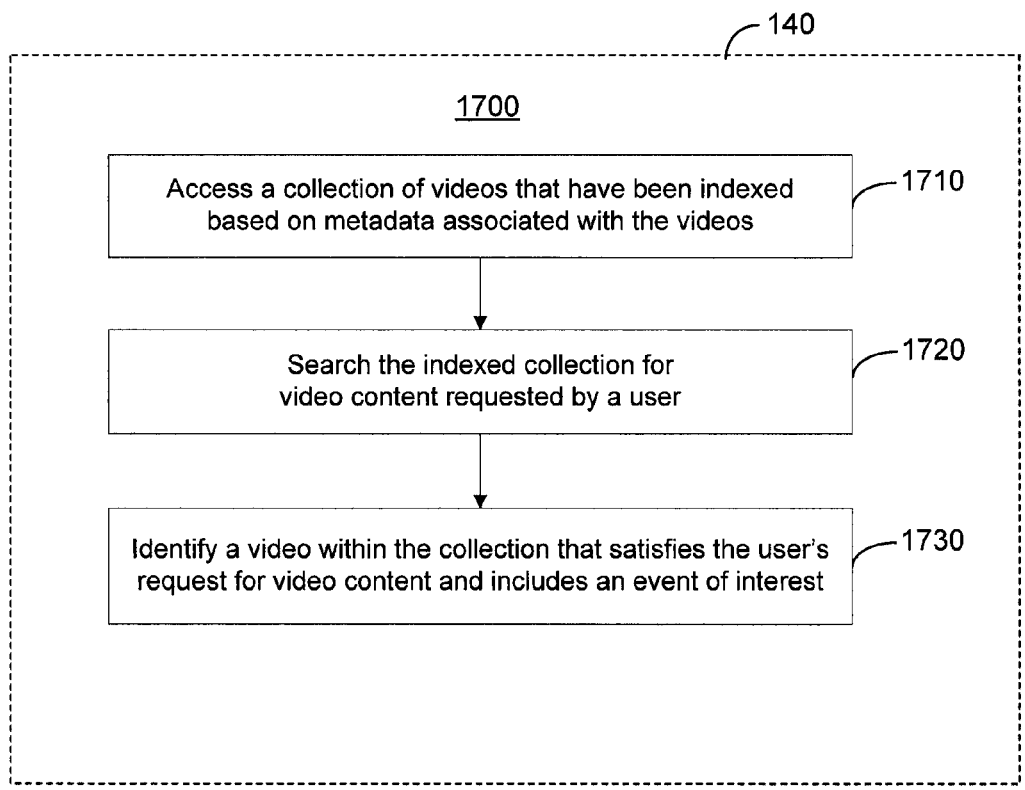
FIG. 17 is a flow chart of an exemplary process for identifying a video that satisfies a user's request for video content in that the video includes an event of interest that is likely related to the user's request for video content.

The process 1700 of FIG. 17 is configured to identify a video that satisfies a user's request for video content in that the video includes an event of interest that is likely related to the user's request for video content. Process 1700 is an example of a process for performing operation 140 of FIG. 1. For convenience, particular components described with respect to FIG. 11 are referenced as performing the process 1700. However, similar methodologies may be applied in other implementations where different components are used to define the structure of the system, or where the functionality is distributed differently among the components shown by FIG. 11.

The analysis module 1141 accesses a collection of videos that have been indexed based on metadata associated with the videos (1710). For example, metadata associated with a video that describes content included in the videos, in addition to events of interest included within that content, may be used to index a collection of videos. A catalog of content included in the videos of the collection may be generated, based on the metadata associated with the videos of the collection, and maintained. The catalog of content may include, for example, keywords that provide a general indication of the subject matter of, and/or content included within, the videos of the collection. The keywords for each video may be associated with a video ID for the video to which the keywords correspond.

The analysis module 1141 searches the indexed collection for the video content requested by the user (1720). For example, the user has provided a search query of "world cup." The analysis module 1141 may search the catalog for content for videos that satisfy the search query "world cup."

The analysis module 1141 identifies a video within the collection that satisfies the user's request for video content and includes an event of interest (1730). For example, the analysis module 1141 may identify a video within the collection that includes content for a France-Italy world cup soccer game. The identified video may be associated with a video ID in the catalog, which may be used to identify events of interest in the video based on metadata, which is also associated with the video ID. The identified world cup soccer game video includes a fight scene where one player head-butts another, which is identified as an event of interest within the video. As such, the identified video may be provided to the user as a video that satisfies the user's request for content and a scene that includes the event of interest may be made perceivable to the user. Because the identified video satisfies the user's request for video content, and the event of interest is an important moment within the identified video, it is likely that the user's request for video content was motivated by a desire to find content related to the event of interest included in the identified video. As such, providing the user with a scene from the identified video that contains the event of interest may best satisfy the user's true information need, despite the fact that the user insufficiently articulated that need in the request for video content.

Figure 18:
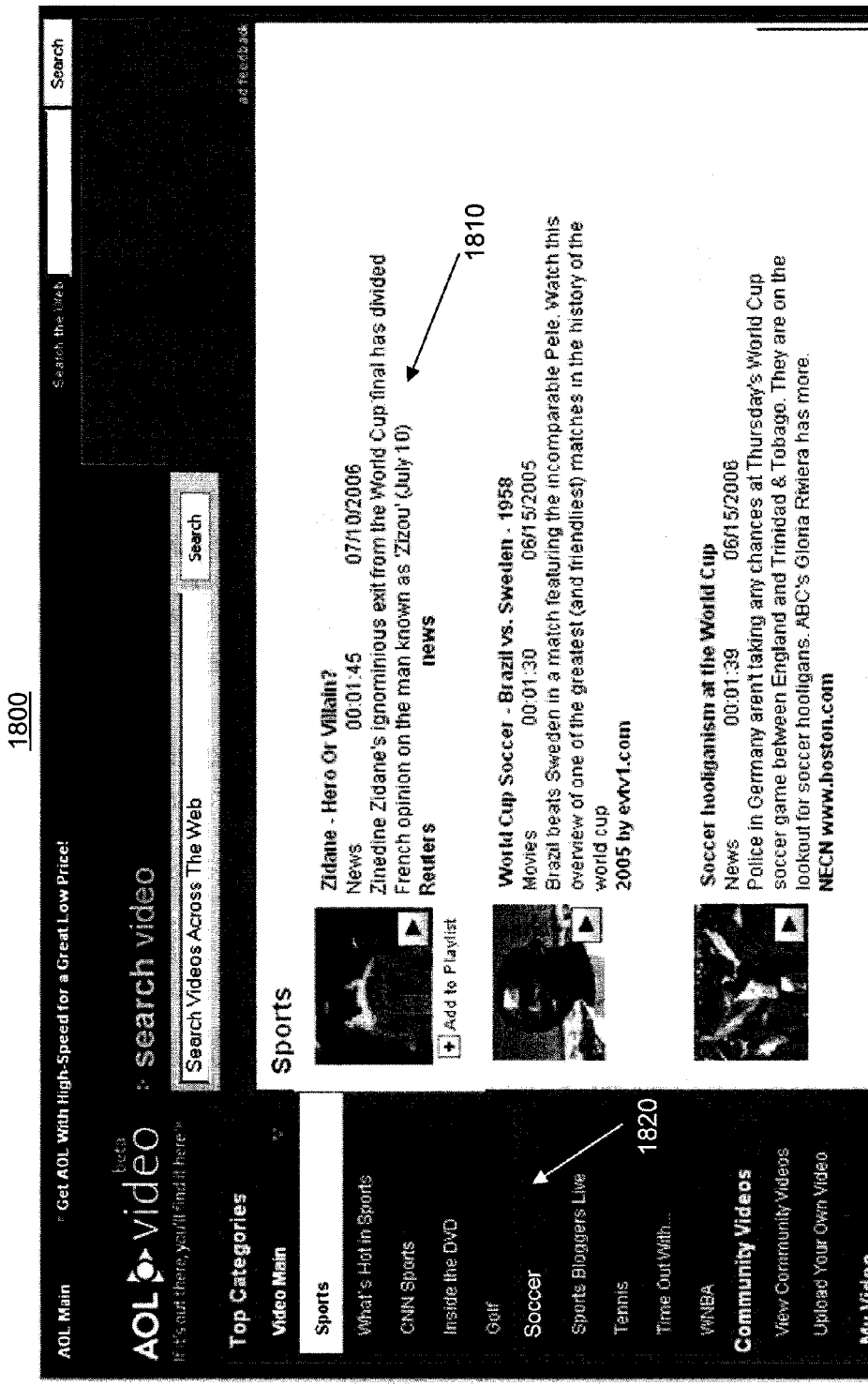
FIGS. 18 and 19 are illustrations of GUIs configured to allow a user to request content associated with a video stream and receive results in response to the request.
Figure 19:

GUIs 1800 and 1900 of FIGS. 18 and 19, respectively, are structured and arranged to allow a user to request content associated with a video stream and receive results in response to the request.

More particularly, GUI 1800 represents a user's entry into a video inbox. Upon entering the video inbox, the user selected a "soccer" sub-category 1820 within a sports category. In response to the selection of the "soccer" sub-category 1820 (e.g., a request for content), GUI 1800 presents the user with scenes that are responsive to the request for content. The scene 1810 may be a scene that is determined by the analysis module 1141 to be most responsive to the request for content based on metadata associated with the video from which the scene is determined. More particularly, scene 1810 includes footage of a fight between soccer players Zidane and Materazzi during the 2006 World Cup finals. The fight scene may be determined to be the most responsive video scene because it is a portion of a full video (e.g., the entire game) that includes an event of interest, as determined based on a number of relevant instant messages received by the analysis module 1141 in connection with the time span during which the event of interest occurred.

GUI 1900 is configured to provide search results to a user in response to a search query 1910 "world cup." As described above, after being informed by metadata associated with a video that is related to the search query "world cup" (e.g., a video associated with the final 2006 World Cup game), the analysis module 1141 may determine that the fight scene represents a true information need of the user. As such, search result 1920, which represents the Zidane-Materazzi fight scene, may be presented to the user in response to the search query 1910 "world cup."

In an implementation associated with FIG. 18, the analysis module 1141 may provide a large number of search results that are responsive to selection of a sub-category, category or a search query, where the search results that correspond to scenes that capture an event of interest may be visually presented in a manner that separates the search result from other search results (e.g., at the top of a list of search results or along with an indication of special status). In an implementation associated with FIG. 19, analysis module 1141 may provide a single search result corresponding to a scene that captures an event of interest.

Although the techniques described herein have been discussed with respect to instant messaging communications, other methods of real-time or non-real-time communication, such as, for example, multi-party chat communications and email communications, also may be used to identify and label events of interest within video content. Similar to that described above with respect to an IM communications session, and for example, participants to a chat communications session may be concurrently (or non-concurrently) viewing a particular video. The messages sent between the chat participants may be monitored for an increase in message traffic and the content of chat communications may be analyzed to identify and label events of interest within the particular video. In another example, a user viewing a particular video may perceive an event of interest, and in response thereto, the user may send an email to another user regarding the event of interest. Because email messages typically include time stamps indicating a time at which the email message was sent, a time stamp associated with the email sent by the user viewing the particular video, along with analysis of the content of the email message, may be used to identify and label an event of interest within the particular video.

The described systems, methods, and techniques may be implemented in digital electronic circuitry, computer hardware, firmware, software, or in combinations of these elements. Apparatus embodying these techniques may include appropriate input and output devices, a computer processor, and a computer program product tangibly embodied in a machine-readable storage device for execution by a programmable processor. A process embodying these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially-designed ASICs (application-specific integrated circuits).

It will be understood that various modifications may be made.

What is claimed is:

1. A computer-implemented method comprising:
monitoring, by at least one processor, messages sent by viewers of a video while the video is perceivable to the viewers, the messages including a video identifier identifying the video;
determining a category associated with the video identifier;
identifying a first window of time associated with the video based on the determined category;
determining an aggregate number of the messages sent by the viewers during the first window of time;
identifying an event of interest in the video based on the aggregate number;
generating metadata corresponding to the video scene; and
enabling the user to access and perceive the video scene based on the metadata.

2. The method of claim 1 further comprising:
segmenting the video to generate a video scene containing the event of interest wherein segmenting the video comprises determining a start time and an end time of a scene of the video in which the event of interest occurs.

3. The method of claim 2, wherein generating the metadata comprises generating metadata that specifies the start time and the end time of the scene of the video in which the event of interest occurs.

4. The method of claim 3, wherein generating the metadata that specifies the scene start time and the scene end time comprises generating metadata that includes the scene start time and the scene end time and that enables the user to selectively view the scene in the video.

5. The method of claim 1, wherein monitoring the messages sent by viewers comprises monitoring messages sent by a viewer of a video to another viewer of the video while both viewers are concurrently viewing the video.

6. The method of claim 1, further comprising:
accessing a timeline of the video; and
determining the first window of time within the timeline of the video.

7. The method of claim 6, wherein estimating the first window of time comprises:
determining, based on the determined category, a duration of time that viewers are typically expected to discuss, through messaging, the event of interest that is anticipated to occur in the video while perceiving the video;
selecting a particular point in the timeline of the video; and
determining the first window of time to be a window of time that begins at the particular point and has a duration corresponding to the estimated duration of time.

8. The method of claim 6, wherein identifying the event of interest comprises:
accessing a threshold;
determining that the aggregate number of messages sent by the viewers during the first window of time meets the threshold; and
concluding that the first window of time corresponds to occurrence of an event of interest in the video and calculating, based on the first window of time, a start time and an end time of a scene of the video in which the event of interest occurs.

9. The method of claim 8, wherein a second window of time occurs subsequent to the first window of time within the timeline of the video.

10. The method of claim 8, wherein estimating the first window of time comprises:
   determining, based on the determined category, a duration of time that viewers are typically expected to discuss, through messaging, the event of interest that is anticipated to occur in the video while perceiving the video;
   selecting a particular point in the timeline of the video; and
   determining the first window of time to be a window of time that begins at the particular point and has a duration corresponding to the estimated duration of time.

11. The method of claim 10,
   wherein determining whether the aggregate number of messages sent during the first window of time meets the threshold comprises determining that the aggregate number of messages sent during the first window of time meets the threshold; and
   wherein calculating, based on the first window of time, a start time and an end time of a scene of the video in which the event of interest occurs comprises;
      determining, based on the determined category, an amount of time associated with the anticipated event of interest; and
      calculating, based on the particular point in the timeline of the video and based on the determined amount of time associated with the anticipated event of interest, the start time and the end time of the scene in the video in which the event of interest occurs.

12. The method of claim 11, wherein calculating the scene start time comprises:
   starting from the selected particular point in the timeline of the video, rewinding the video by the amount of time associated with the anticipated event of interest; and
   marking the time at which the rewinding stops as the scene start time.

13. The method of claim 11, wherein calculating the scene end time comprises:
   starting from the selected particular point in the timeline of the video, fast forwarding the video by a predetermined amount of time; and
   marking the time at which the fast forwarding stops as the scene end time.

14. The method of claim 10, further comprising determining a second window of time, wherein estimating the second window of time comprises:
   selecting a second particular point in time in the timeline of the video; and
   determining the second window of time to be a window of time that begins at the second particular point and has a duration corresponding to the estimated duration of time that viewers are typically expected to discuss, through messaging, the anticipated event of interest.

15. The method of claim 14, further comprising determining an aggregate number of messages sent by the viewers of the video during the second window of time.

16. The method of claim 15, wherein identifying the event of interest further comprises:
   determining that the aggregate number of messages sent by the viewers of the video during the second window of time meets the threshold; and
   concluding that the second window of time corresponds to occurrence of an event of interest in the video and calculating, based on the second window of time, a start time and an end time of a scene of the video in which the event of interest occurs.

17. The method of claim 6, wherein determining an aggregate number of the messages that are received during the first window of time comprises:
   receiving an indication the video has started and an identification of the viewers of the video;
   initializing a video clock;
   receiving messages sent by the viewers and assigning a time T0 to each message, the time T0 being a time of receipt of the message as indicated by the video clock;
   determining a message input probability curve for each message that has been assigned a time T0 that falls within the first window of time; and
   combining the message input probability curves for the messages that have been assigned a time T0 that falls within the first window of time.

18. The method of claim 17, wherein determining the message input probability curve for a message that has been assigned a time T0 that falls within the first window of time comprises:
   determining a network delay;
   moving backwards from the time T0 by the network delay to a time T-1;
   determining an amount of typing time for the identified message;
   moving backwards from T-1 by the amount of typing time to a time T-2; and
   determining a message input probability curve, wherein the message input probability curve comprises a probability distribution curve centered at T-2 that reflects a time at which a sender of the message began inputting the message.

19. The method of claim 1, wherein monitoring the messages sent by viewers comprises monitoring messages sent by a viewer of the video to a user who is not viewing the video.

20. The method of claim 1, wherein monitoring the messages sent by viewers comprises monitoring the messages sent by a viewer subsequent to or concurrent with the occurrence of the event of interest in the video.

21. The method of claim 1, wherein monitoring the messages comprises monitoring messages that include a frame identifier that identifies a frame of the video.

22. The method of claim 21, wherein monitoring messages that include a frame identifier comprises monitoring messages that include a frame identifier that identifies the frame displayed to a viewer of the video at the time that the viewer initiates inputting message text to be subsequently sent as a message by a client system.

23. The method of claim 21, wherein monitoring messages that include a frame identifier comprises monitoring messages that include a frame identifier that identifies the frame displayed to a viewer of the video at the time that the viewer requests delivery of a message previously inputted by the viewer, the message being delivered as a message from a client system across a data network in response to the request.

24. The method of claim 1, wherein monitoring messages sent by viewers comprises receiving messages sent by a viewer.

25. The method of claim 24, further comprising filtering, based on the determined category, the monitored messages to identify messages having content relating to the video, and
   wherein determining the aggregate number of the messages sent by the viewers comprises aggregating the identified messages having content relating to the video.

26. The method of claim 25 wherein receiving messages sent by a viewer comprises receiving text messages and filtering the received messages based on the determined category comprises:

determining one or more keywords associated with the determined category;

analyzing text of a particular message of the received messages;

determining whether the analyzed text includes the one or more keywords;

storing the text of the particular message and a frame identifier that is associated with the particular message conditioned on the analyzed text including the one or more keywords; and discarding the particular message conditioned on the analyzed text not including the one or more keywords.

27. A computer program product stored on a computer-readable storage medium that includes instructions that, when executed by one or more processors, cause the one or more processors to:

monitor messages sent by viewers of a video while the video is perceivable to the viewers, the messages including a video identifier identifying the video;

determine a category associated with the video identifier;

identify a first window of time associated with the video based on the determined category;

determine an aggregate number of the messages sent by the viewers during the first window of time;

identify an event of interest in the video based on the aggregate number;

generate metadata corresponding to the video scene; and enable the user to access and perceive the video scene based on the metadata.

28. A system comprising:

one or more storage mediums storing instructions; and one or more processors that, upon executing the instructions from at least one of the one or more storage mediums, are configured to:

monitor messages sent by viewers of a video while the video is perceivable to the viewers, the messages including a video identifier identifying the video;

determine a category associated with the video identifier;

identify a first window of time associated with the video based on the determined category;

determine an aggregate number of the messages sent by the viewers during the first window of time;

identify an event of interest in the video based on the aggregate number;

generate metadata corresponding to the video scene; and enable the user to access and perceive the video scene based on the metadata.

29. The computer program product of claim 27, wherein the instructions, when executed by the one or more processors, further cause the one or more processors to segment the video to generate a video scene containing the event of interest.

30. The system of claim 28, wherein the one or more processors, upon executing the instructions, are further configured to segment the video to generate a video scene containing the event of interest.

* * * * *